(12) United States Patent
Amou et al.

(10) Patent No.: US 6,543,412 B2
(45) Date of Patent: Apr. 8, 2003

(54) INTAKE AIR CONTROL DEVICE AND INTERNAL COMBUSTION ENGINE MOUNTING THE SAME

(75) Inventors: Kiyoshi Amou, Chiyoda (JP); Yoshio Okamoto, Minori (JP); Yuzo Kadomukai, Ishioka (JP); Takehiko Kowatari, Kashiwa (JP); Ayumu Miyajima, Narita (JP); Masami Nagano, Hitachinaka (JP); Takanobu Ichihara, Hitachinaka (JP); Hiroaki Saeki, Hitachinaka (JP); Tadashi Someno, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/819,704

(22) Filed: Mar. 29, 2001

(65) Prior Publication Data

US 2001/0027776 A1 Oct. 11, 2001

(30) Foreign Application Priority Data

Mar. 29, 2000 (JP) ......................................... 2000-095223
Oct. 17, 2000 (JP) ......................................... 2000-321915

(51) Int. Cl.[7] ................................................. F02D 9/08
(52) U.S. Cl. ...................... 123/337; 123/590; 123/549
(58) Field of Search ............................... 123/685, 337, 123/549, 470, 453, 478, 590

(56) References Cited

U.S. PATENT DOCUMENTS

| | | | | |
|---|---|---|---|---|
| 4,257,375 A | * | 3/1981 | Ulrich | 123/452 |
| 4,674,460 A | * | 6/1987 | Asmus | 123/445 |
| 4,922,876 A | * | 5/1990 | Mizoguchi et al. | 123/470 |
| 5,329,905 A | * | 7/1994 | Kawaguchi et al. | 123/432 |
| 5,482,023 A | | 1/1996 | Hunt et al. | |
| 5,873,354 A | * | 2/1999 | Krohn et al. | 123/549 |
| 6,039,029 A | * | 3/2000 | Nagasaka et al. | 123/336 |
| 6,067,970 A | * | 5/2000 | Awarzamani et al. | 123/549 |

FOREIGN PATENT DOCUMENTS

JP 4-232353 8/1996

* cited by examiner

Primary Examiner—Erick Solis
(74) Attorney, Agent, or Firm—Antonelli, Terry, Stout & Kraus, LLP

(57) ABSTRACT

A main passage mounting a throttle valve and an air bypass flow passage for reducing HC emission by promoting atomization of the fuel spray injected from the assembly pipe fuel injector are integrated in a body of an intake air control device arranged upstream of an assembly pipe in a one-piece structure to form a unit. Thereby, the intake air control device can be easily manufactured and easily mounted on and dismounted from the intake air system. The amount of HC emitted during warming-up operation of an internal combustion engine is reduced by efficiently supplying fuel spray injected from an assembly pipe fuel injector at the time of starting and warming-up operations for the internal combustion engine.

5 Claims, 16 Drawing Sheets

FIG. 19

| | SINGLE-HOLE NOZZLE | MULTI-HOLE NOZZLE | STEP NOZZLE | SLIT NOZZLE |
|---|---|---|---|---|
| SHAPE OF NOZZLE END | | | | |
| VIEW SEEING IN DIRECTION OF ARROW A | | | | |
| VIEW SEEING IN DIRECTION OF ARROW B | | | | |
| SHAPE OF FUEL SPLAY ADHERING ON HEATER SURFACE | | | | |

INTAKE AIR CONTROL DEVICE AND INTERNAL COMBUSTION ENGINE MOUNTING THE SAME

BACKGROUND OF THE INVENTION

The present invention relates to an intake air control device and an internal combustion engine mounting an intake air control device; and, more particularly, the invention relates to a technique for improving combustion performance in an internal combustion engine and for reducing the amount of hydrocarbons (hereinafter, referred to as HC) emitted at the time of warming-up operation of the internal combustion engine.

An intake air control device for an engine is disclosed in Japanese Patent Application Laid-Open Hei 4-232353. In this intake air control device, a cold-start injector projecting inside a main intake air passage is arranged at a position near an outer peripheral portion of the throttle valve when the throttle valve is in a partially open position. However, operation of this arrangement is difficult in that most of the fuel spray, which is injected in the main intake air passage from the cold-start injector projecting inside the main intake air passage and is vaporized (atomized) and transported to each of the combustion chambers by intake air flowing in the main intake air passage, is caused to adhere onto the inner surface of the main intake air passage and to be stagnated there. Therefore, it is difficult to stably supply the vaporized fuel sufficiently to each of the combustion chambers.

Further, a cold-start fuel control system comprising a cold-start fuel injector, a heater and an idle speed control valve (hereinafter, referred to as an ISC valve) is disclosed in the specification and drawings of U.S. Pat. No. 5,482,023. In this system, a part of the air from the ISC valve (a first air flow) is merged with fuel injected from the cold-start fuel injector. For this purpose, the opening of an air flow passage from the ISC valve is arranged to have an annular shape so as to surround an outlet portion of the cold-start fuel injector. The fuel ejected from the cold-start fuel injector merges with the first air flow and just after merging enters into and passes through the inside of a cylindrical heater arranged in series downstream of the cold-start fuel injector.

In addition, an air passage for allowing part of the air from the ISC valve to flow therethrough is formed in the outside periphery of the heater, and the air flowing through this air passage (a second air flow) merges with the fuel spray, which has passed through the inside of the heater, at the outlet portion of the heater. The fuel coming out of the cold-start fuel injector is further vaporized while passing through the inside of the heater and is even further vaporized as it is mixed with the second air flow at the outlet portion of the heater. The outlet portion of the heater is in communication with the intake assembly pipe, and the fuel spray which has been highly vaporized is distributed to each of the cylinders after being discharged into the intake assembly pipe.

In the above-described system, a mixing chamber for mixing the fuel and the air inside the cylindrical heater is provided to form a kind of atomizer having a heater exit forming a fuel outlet, by arranging, from the upstream side, in order, the cold-start fuel injector, the merging point of the fuel injected from the cold-start fuel injector with the air flow and the mixing chamber constructed inside the heater. It can be considered that the atomizer is an air assist type atomizer which uses the energy of the air flow, and it is also an internal mixing type atomizer which performs air-liquid mixing by merging the fuel with the air inside the atomizer.

In the above-described system, the second air flow flows into the outer peripheral portion of the heater and is merged with the fuel spray that has passed through the inside of the heater, while flowing in the same direction to promote vaporization of the fuel spray. However, in this system, the application of the fuel spray to the intake pipe and the transportation in the intake pipe after that is not sufficiently taken into consideration.

In the above-described system, the fuel injected from the cold-start fuel injector is further vaporized by passing through the narrow and long passage formed inside the heater while contacting surfaces of the heater. However, in this system, the vaporizing efficiency of the heater is not sufficiently taken into consideration.

In the above-described system, the outlet portion of the heater is in communication with the intake assembly pipe; and, the fuel spray subjected to further vaporization is discharged into the intake assembly pipe and is then distributed to each of the cylinders. However, in this system, improvement of the distribution to each of the cylinders is not sufficiently taken into consideration.

SUMMARY OF THE INVENTION

An object of the present invention is to provide an intake air control device which is capable of reducing the amount of HC emitted at the time of warming-up operation of an internal combustion engine.

Another object of the present invention is to provide an intake air control device which is easily manufactured, and easily mounted and dismounted.

A further object of the present invention is to reduce the amount of fuel adhering onto a wall surface of the intake pipe and to reduce the amount of HC emitted at the time of warming-up operation of an internal combustion engine by improving the application of the fuel injected from a second injector to the intake pipe and the transportation of the fuel to the downstream side, the second fuel injector being additionally arranged separately from a first fuel injector arranged at a position near the cylinder of an internal combustion engine and used at starting operation of the internal combustion engine.

A still further object of the present invention is to decrease the electric energy consumed by a heater for atomizing the fuel spray by modifying the behavior of the fuel spray with regard to contact with the heater.

A further object of the present invention is to improve the uniformity of distribution of the fuel spray to each of the cylinders by modifying the method of supplying the fuel spray to the intake pipe.

The present invention is characterized by an intake air control device comprising a body having a main flow passage for supplying air to the cylinders of an internal combustion engine, a throttle valve for controlling air flow rate arranged inside the main flow passage; and a fuel injector for supplying fuel into the main flow passage, the fuel injector being fit and attached to the body. The body is formed by working a body member into a one-piece structure comprising an opening portion communicating with an outer portion of the body, with the main flow passage being on a downstream side of the throttle valve; and a mounting portion for fitting and attaching the fuel injector facing an opening plane of the opening portion.

The intake air control device further comprises a first bypass flow passage communicating with the inside of the main flow passage through the opening portion, the first bypass flow passage being branched from the main flow passage on the upstream side of the throttle valve; and a second bypass flow passage communicating with the inside of the main flow passage on the downstream side of the throttle valve and on the upstream side or the downstream side of the opening portion, the second bypass flow passage being branched from the main flow passage on the upstream side of the throttle valve.

BRIEF DESCRIPTION OF DRAWINGS

FIGS. 4(a) and 4(b) are graphs showing atomization characteristics of the fuel spray, wherein FIG. 4(a) is a graph showing the relationship between average droplet size and gas-to-liquid volumetric flow rate ratio which is the volumetric flow rate ratio of air collide with the fuel spray to the fuel spray injected from the fuel injector, and FIG. 4(b) is a graph showing the distribution of droplet size;

FIGS. 5(a) and 5(b) are graphs showing characteristics of electric power supplied to a heater, wherein FIG. 5(a) is a graph showing the relationship between voltage applied to the heater and time, and FIG. 5(b) is a graph showing the relationship between current flowing in the heater and time;

FIGS. 6(a) to 6(c) are graphs showing the operating conditions and the exhaust characteristics, wherein FIG. 6(a) is a graph showing the relationship between average droplet size and ignition timing, FIG. 6(b) is a graph showing the relationship between ignition timing and the temperature of the catalyst, and FIG. 6(c) is a graph showing the relationship between the rising time of the catalyst temperature of FIG. 6(b) and the amount of exhausted HC;

FIGS. 7(a) to 7(c) are timing diagrams showing the relationship between injection timing of each fuel injector and time, wherein FIG. 7(a) is a diagram showing timing of operation of switching an assembly pipe fuel injector and a port fuel injector, and FIG. 7(b) and FIG. 7(c) are diagrams showing a control signal of an opening-and-closing valve under operation of the assembly pipe fuel injector;

FIG. 19 is a chart illustrating spray shapes depending on the difference in the shape of a spray hole in a front end of various kinds of fuel injectors which are to be applied to the intake air control device in accordance with the present invention.

DESCRIPTION OF THE PREFERRED EMBODIMENTS OF THE INVENTION

The first embodiment of an intake air control device and an internal combustion engine mounting an intake air control device in accordance with the present invention will be described with reference to FIG. 1 to FIG. 7.

Figure 1:
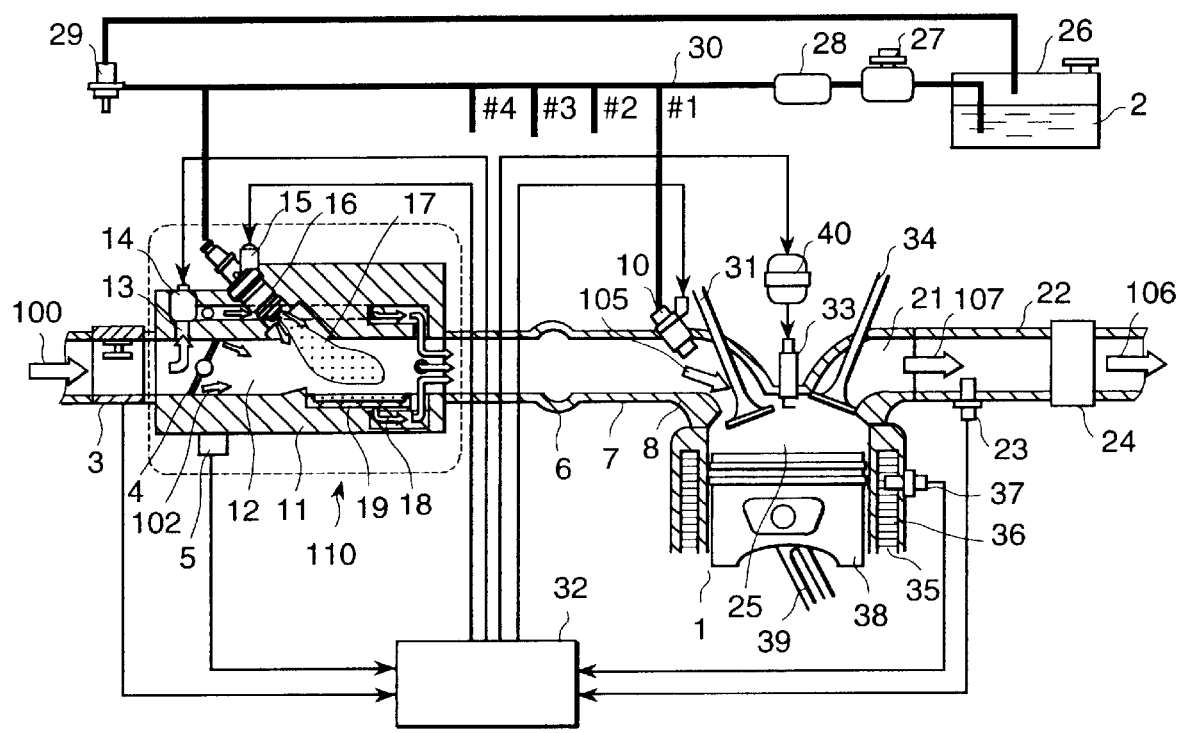
FIG. 1 is a diagram showing the system structure of the first embodiment of an intake air control device in accordance with the present invention and an internal combustion engine in which the intake air control device is mounted.

Referring to FIG. 1, the internal combustion engine 1 is a well-known multi-cylinder engine of the spark ignition type using gasoline as the fuel, but only one of the cylinders is illustrated in the figure.

The intake air system is composed of an air flow sensor 3 for measuring the flow rate of intake air 100 sucked through an air cleaner (not shown); an intake air control device 110 containing a throttle valve 4, the opening-and-closing operation of which is linked to accelerator operation by a driver; a throttle valve positioning sensor 5 for measuring the opening degree of the throttle valve 4; an intake air assembly pipe 6; an intake air manifold 7 for branching the intake air assembly pipe 6 to each of the cylinders; and an intake air port 8 having an intake air valve 31. The intake air assembly pipe constitutes an intake air pipe before branching to each of the cylinders. Signals representing the amount of intake air and the opening degree of the throttle valve 4 as measured by the air flow sensor 3 and the throttle valve positioning sensor 5 are input to a controller 32 to be used for detecting the operating conditions and effecting various kinds of a control of the internal combustion engine 1.

The exhaust gas system is composed of an exhaust port 21 having an exhaust valve 34 for each of the cylinders; an exhaust manifold 22; an oxygen concentration sensor 23 for measuring the oxygen concentration in the exhaust gas; a ternary catalyst converter 24 for purifying the exhaust gas; and a silencer muffler (not shown in figure). Further, a signal representing the oxygen concentration measured by the oxygen concentration sensor 23 is input to the controller 32 to be used for detecting the operating conditions and effecting various kinds of the control of the internal combustion engine 1.

The fuel system is composed of a fuel tank 26 for storing fuel 2; a fuel pump 27 for pressurizing and pumping the fuel 2 from the fuel tank 26; a fuel filter 28; a pressure regulator 29 for regulating pressure of the pumped fuel 2 to an appropriate pressure; port fuel injectors 10 representing first fuel injectors for injecting fuel to the intake air ports 8 of the cylinders (#1, #2, . . . ), respectively; and an assembly pipe fuel injector 15 representing a component of a second fuel injector for injecting fuel to be supplied to the intake assembly pipe 6, and these components are connected by fuel piping 30. The assembly pipe fuel injector 15 is a fuel injector arranged downstream of the throttle valve 4 of the main flow passage 12 and upstream of the intake air assembly pipe 6, and, accordingly, it will be referred to as the assembly pipe fuel injector in order to discriminate it from the port fuel injector 10.

An injection of the fuel 2 from the assembly pipe fuel injector 15 and the port fuel injector 10 is controlled corresponding to an operating condition of the internal combustion engine 1; more particularly, it is performed based on a command signal output from the controller 32. The fuel injection of the assembly pipe fuel injector 15 and the port fuel injector 10 is switched corresponding to the starting operation of the internal engine 1, an operation during a preset period after starting and an operating condition of the internal combustion engine 1 after, the details of which will be described later.

The intake air control device 110 is formed as a unit which can be easily mounted on and removed from the intake air system of the internal combustion engine 1 by integrating the second fuel injector having the assembly pipe fuel injector into a one-piece structure so as to be contained inside the single body 11. The structure and the operation thereof will be described later.

Each of the cylinders of the internal combustion engine 1 comprises a combustion chamber 25 in which an ignition plug 33 is arranged so as to be exposed to the combustion chamber 25, and an intake valve 31 and an exhaust valve 34 for controlling the cycle of intake stroke, compression stroke, expansion stroke and exhaust stroke by opening and closing operation. Electric power supplied from a battery and an alternator (both are not shown in the figure) is converted to high voltage electric power by an ignition coil 40, and the high voltage electric power is distributed to the ignition plugs 33 to perform spark ignition at appropriate timings corresponding to signals received from the controller 32.

A water jacket 36 is provided in the side portion of the combustion chamber 25, the inside of which carries cooling water 35 for cooling the internal combustion engine 1. The temperature of the cooling water 35 is measured by a water temperature sensor 37 arranged in the water jacket 36, and a signal representing temperature is input to the controller 32 to be used for detecting the operating condition of the internal combustion engine 1 and controlling the internal combustion engine 1.

Further, the rotation angle of a crank shaft (not shown in the figure) linked to a piston 38 through a connection rod 39 is measured by a crank angle sensor (not shown in the figure). The controller 32 can detect the position of the piston 38 in response to the signal representing the measured value received from the crank angle sensor.

As the internal combustion engine 1 is operated, a mixed gas made up of the fuel injected from the assembly pipe fuel injector 15 or the port fuel injector 10 and the intake air 100 is sucked into the combustion chamber 25, and the mixed gas sucked into the combustion chamber 25 is ignited by the ignition plug 33 at a time near the top dead point between compression stroke and expansion stroke so as to be burned. The burned gas 107 after combustion is discharged from the combustion chamber 25 and then flows to the ternary catalyst converter 24 through the exhaust port 21 and the exhaust manifold 22 to be purified there, after which it is exhausted to the outside of the internal combustion engine 1 as a final exhaust gas 106.

The construction of the intake air control device 110 will be described in more detail with reference to FIG. 2.

The intake air control device 110 comprises a main passage 12 formed in a body 11 having flanges to join it to the intake air system at both ends; and, the throttle valve 4 is arranged inside the main passage 12. By opening the throttle valve 4, the upstream side and the downstream side of the main passage 12 are communicated with each other. Further, in the body 11 forming the main passage 12, a bypass flow passage 13 connecting (communicating) the upstream side and the downstream side of the throttle valve 4 is formed separately from the main passage 12. An ISC valve 14 is arranged in the bypass flow passage 13, and the flow rate of air 101 flowing through the bypass flow passage 13 is controlled by opening and closing the ISC valve 14 at the time of starting operation of the internal combustion engine 1 and during idling operation when warming-up the internal combustion engine 1.

The bypass flow passage 13 is branched to flow passages 13a, 13b downstream of the ISC valve 14. One of the bypass flow passages 13a communicates with a fuel injector mounting portion 16 formed as a circular passage arranged so as to communicate with the main passage 12 from the outside of the body 11. The fuel injector mounting portion 16 is used for mounting the assembly pipe fuel injector 15 and is disposed at an angle a to the axial flow direction of the main passage 12 in the body 11. The inner end (the bottom portion) of the fuel injector mounting portion 16 opens into a circular recessed portion 161 formed in the main passage 12 in the body 11, and the outer end opens to the outside of the body 11. The assembly pipe fuel injector 15 is inserted into the fuel injector mounting portion 16 so as to be attached to the body 11 of the intake air control device 110 and to be sealed with a seal ring 151. By doing so, a pressure regulation chamber 41 is formed around the assembly pipe fuel injector 15. The bypass flow passage 13a is in communication with the pressure regulation chamber 41.

The angle between a center line of the fuel spray, which is assumed to constitute the spray direction of the assembly pipe fuel injector 15, and a center axis line passing through the center of the main passage 12, which is assumed to be the axial flow direction, is set to the angle α.

In order to easily form the body 11 of the intake air control device 110, the assembly pipe fuel injector 15 may be formed so as to be attached the body 11 through an adapter, though there is a possibility that this will cause an increase in the device size and in the man-hours required for assembling the device.

The center line of the fuel spray is considered to be a line connecting the center of the fuel injection hole of the fuel injector and the central point of a cross section of the injected fuel spray. In general, the center line of the fuel spray agrees with the direction in which the valve body of the fuel injector in driven, or agrees with an axis of the valve shaft set to a direction of the driving shaft for driving the valve body, or agrees with a line passing through the center of the fuel injection hole in parallel to the wall surface forming the injection hole. However, when the fuel injection hole is slanted relative to the valve axis or the outlet of the fuel injection hole is modified, the center line of the fuel spray does not always agree with the valve axis or the center line of the fuel injection hole.

In the bottom portion of the pressure regulation chamber 41 arranged in the recessed portion 161 of the main passage 12, a nozzle 47 of the assembly pipe fuel injector 15 is placed, and a circular hole 46 positioned just below the injection hole portion of the nozzle 47 is formed to communicate with the main passage 12 downstream of the throttle valve 4 through the recessed portion 161. The side portion of the nozzle 47 of the assembly pipe fuel injector 15 is positioned by a guide surface 48 formed in the inner peripheral portion of a plurality of passage forming projections 49 provided in the bottom portion of the pressure regulation chamber 41. Further, the outlet end portion of the nozzle 47 is spaced by a very small gap from the inner surface of the circular hole 46 along the inner side of the guide surface 48, and the passage forming projections 49 are set at the height of the gap. The end surface 50 of the passage forming projections 49 is in contact with the shoulder portion 15 of the assembly pipe fuel injector 15, and the contact surface is illustrated by the dotted line in the FIG. 2(b). The spaces between the plurality of passage forming projections 49 allow the pressure regulation chamber 41 to communicate with the circular hole 47. Therein, the circular hole 46 is formed in a shape which is as thin in the axial direction as possible, that is, to form what is called a thin edge orifice.

On the other hand, the other bypass flow passage 13b which extends from a branch inlet portion 43 provided downstream of the ISC valve 14 is in communication with a pressure regulation chamber 42 through a branch outlet portion 44. The pressure regulation chamber 42 communicates with the main passage 12 by way of a plurality of carrier air passages 45 formed opposite to each other so as to be directed toward the center axis in the axial flow direction of the main passage 12.

In the present embodiment, the carrier air passage 45 are formed downstream of a heater 18. The heater 18 constitutes a heating body for generating heat to evaporate fuel and is formed by arranging a plurality of plate-shaped heater elements in an arc-shape along the inner wall surface of the main passage 12. The heater element is a PTC heater (a ceramic heater) which has the function of maintaining its temperature constant by reducing current by rapidly increasing the electrical resistance when the temperature rises above a preset value. A thermal insulator 19 for reducing heat transfer from the heater 18 to the wall surface of the main passage 12 is arranged between the heater 18 and the main passage 12.

Further, a projecting portion 20 is provided on the wall surface of the main passage 12 upstream of the heater 18 so as to prevent the air flowing from the upstream side of the heater 18 from directly hitting onto the heater 18; however, the projecting portion 20 may be eliminated when the amount of the air flowing from the upstream side and hitting onto the heater is small.

Figure 2A:
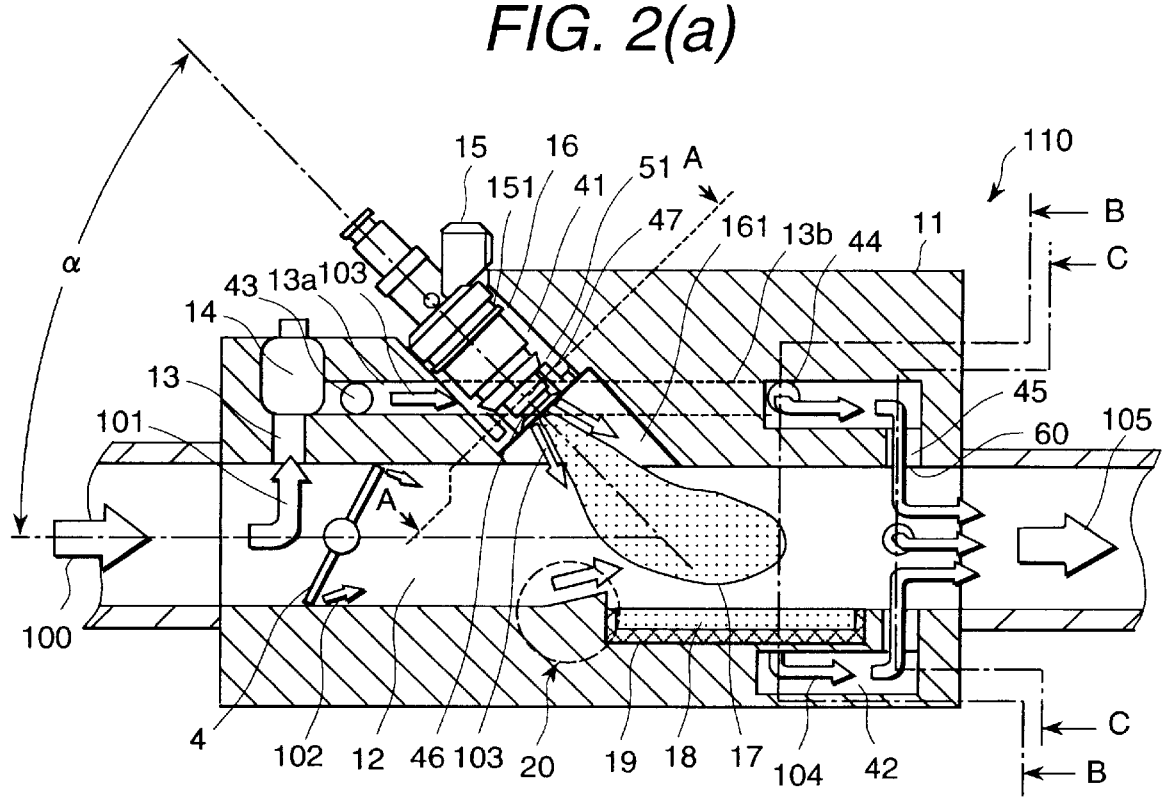
FIG. 2(a) is an enlarged view of the portion 110 in FIG. 1 showing a vertical cross-section of the intake air control device in accordance with the present invention.
Figure 2B:
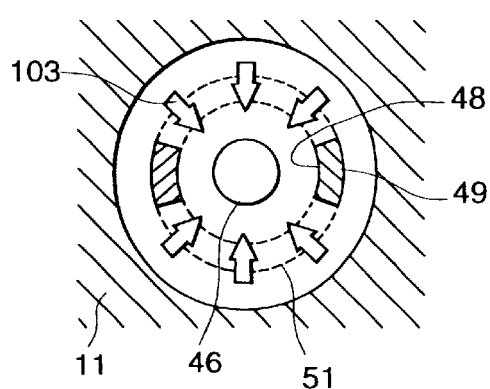
FIG. 2(b) is a cross-sectional view taken on the plane of the line A—A of FIG. 2(a)
Figure 3A:
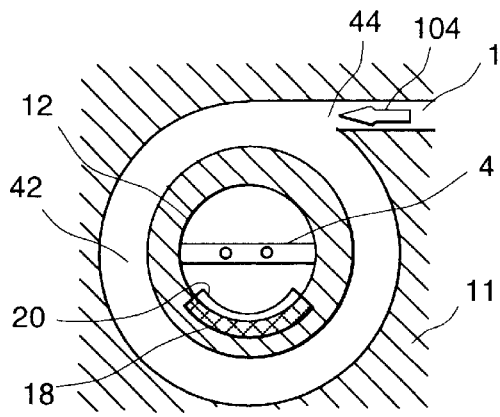
FIG. 3(a) is a cross-sectional view taken on the plane of the line B—B of FIG. 2(a)
Figure 3B:
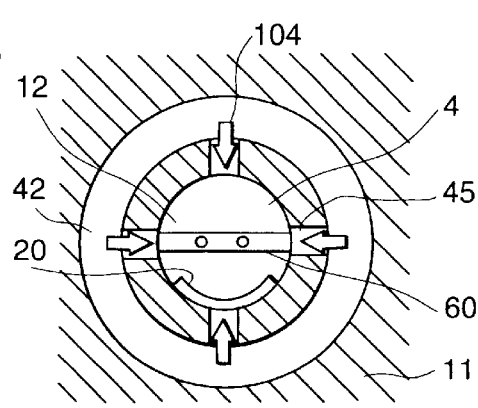
FIG. 3(b) is a cross-sectional view taken on the plane of the line C—C of FIG. 2(a)
Figure 4A:
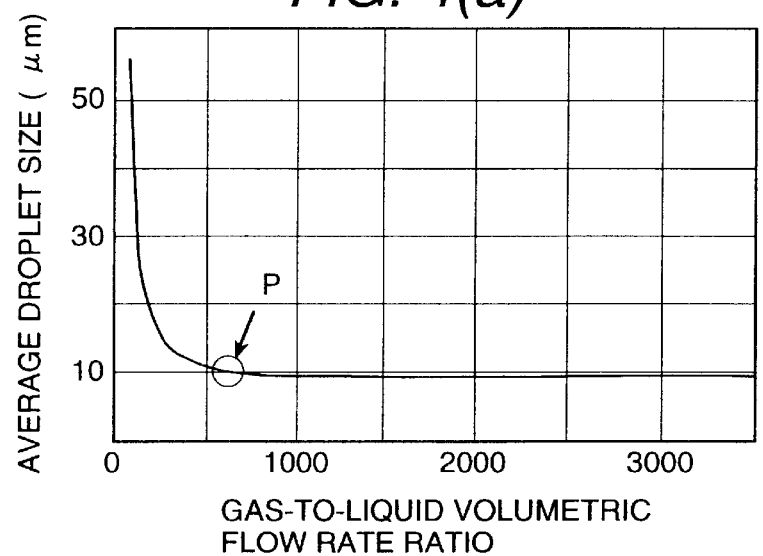
Figure 4B:
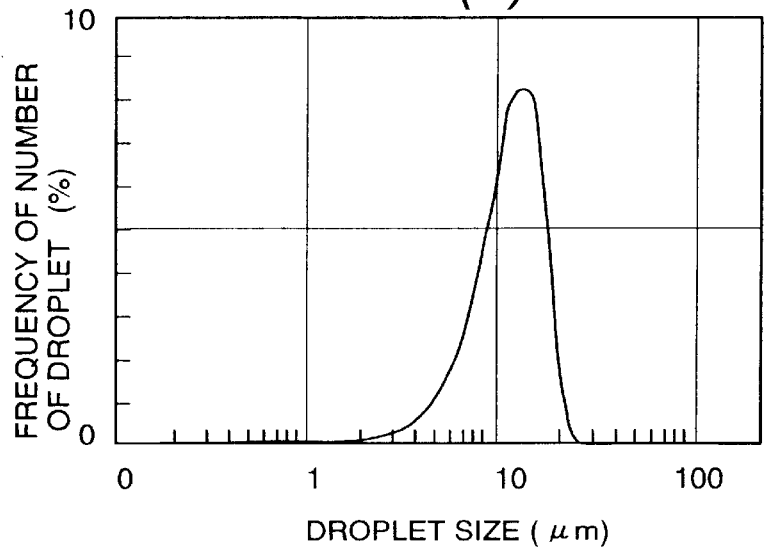

The structure of the flow passage from the bypass flow passage 13b to the main passage 12 through the branch outlet portion 44, the pressure regulation chamber 42 and the carrier air passages 45 will be described in more detail with reference to FIG. 3(a) and FIG. 3(b), which are a cross-sectional view taken on the line B—B in FIG. 2(a) and a cross-sectional view taken on the line C—C in FIG. 2(a), respectively.

The pressure regulation chamber 42 is an annular space arranged around the outer periphery of the main passage 12, and it communicates with the main passage 12 through the carrier air passages 45. Four carrier air passages 45 are formed so as to open through the inner peripheral wall of the main passage 12 downstream of the heater 18 in the main passage 12, and they are arranged so as to opposed each other in pairs.

According to the present embodiment, the intake air control device 110 is constructed by forming the injector mounting portion 16 of the assembly pipe fuel injector 15, the bypass flow passages 13, 13a and 13b, the recessed portion 161, the pressure regulation chambers 41 and 42, the atomizing air passage (the passage from the pressure regulation chamber 41 to the circular hole 46 through which the air 103 flows) and the carrier air passages 45 in the body forming the main passage 12 in the form of a one-piece structure; and, the throttle valve 4, the drive mechanism of the throttle valve 4 (not shown in the figure), the assembly pipe fuel injector 15, the ISC valve 14 and the heater 18 are mounted therein. Therefore, the intake air control device 110 is formed so as to be detachable from the intake pipe as a unit. Since the important device relating to starting and warming-up operation of the internal combustion engine 1 can be mounted onto and dismounted from the internal combustion engine 1 as a unit, the assembling, the adjustment and the maintenance thereof can be easily performed.

If the body 11 is formed through resin molding, the body 11 can be efficiently manufactured, and the intake air control device 110 can be made light in weight. The resin molded body can be employed in the embodiments to be described later.

The effects of the air flowing in the bypass flow passages 13a, 13b will be described in more detail. The air flowing in the bypass flow passage 13a flows from the periphery of the nozzle 47 of the assembly pipe fuel injector 15 into the annular gap formed between the outlet end portion of the nozzle 47 and the circular hole 46, and collides (merges) with the fuel injected from the assembly pipe fuel injector 15 from a direction crossing the injection direction of the fuel. Then, the air flows out through the circular hole 46 formed below along the axis of the assembly pipe fuel injector 15 and into the recessed portion 161 opening into the main passage 12 so as to flow toward the heater 18, while dragging or inducing the flow of the fuel spray 17.

On the other hand, after the air flow is regulated in the pressure regulation chamber 42, the air 104 flowing in the bypass flow passage 13b flows from the plurality of carrier air passages 45 arranged opposite to each other into the main passage 12, and after colliding with each other, the flow directions are diverted toward the downstream side. The amount of the air 104 flowing in the bypass passage 13b represents most of the total air flow rate controlled by the ISC valve 14. That is, the air 104 flowing out from the carrier air flow passage 45 produces a strong drag flow on the downstream side of the heater 18, and drags the atomization-promoted fuel spray injected from the assembly pipe fuel injector 15 and the partially vaporized fuel vapor produced by the heater 18 so as to transport this mixture to the downstream side.

Further, by setting the injection direction of the fuel spray 17 which is injected from the assembly pipe fuel injector 15, at an angle a relative to the center axis of the axial flow direction of the main passage 12, the fuel spray 17 is made to easily flow along the drag flow formed by the air 104 flowing out from the carrier air passages 45. Furthermore, since the carrier air passage 45 are arranged on the downstream side of the heater 18, the carrier air 104 does not directly remove the heat from the heater 18 when the carrier air flows in the main passage 12.

A ratio of air flow rates 103 and 104 flowing in the bypass flow passages 13a, 13b is determined by a ratio of the area of the air passage formed in the gap between the outlet end portion (a front end surface) of the nozzle 47 and the bottom surface of the injector mounting portion 16 having the circular hole 46 formed therein to the total area of the plurality of the carrier air passages 45. The present embodiment is designed so that the flow rate of the fuel atomizing air 103 may become sufficiently smaller compared to the flow rate of the carrier air 104.

Production of the fuel spray 17 by the assembly pipe fuel injector 15 and effects of fuel vaporization will be described in more detail.

In the present embodiment, the assembly pipe fuel injector 15 employs a fuel injector of the upstream swirl type which imparts a swirl to the fuel inside the nozzle 47. That is, the fuel injector is of the type such that a fuel spray in a thin-film 401 shape is sprayed by converting the pressure energy of the fuel to swirl energy so as to promote the atomization of the fuel. By assisting application of the air 103 to the fuel spray 17 in the thin-film 401 shape, the atomization can be further rapidly promoted to produce a fine fuel spray 17. In addition, since the circular hole 46 has a thin edge orifice shape, the energy loss of the fuel and the air can be suppressed to a very small value when the fuel and the air pass through the orifice (the circular hole 46), so that the atomization can be promoted.

FIG. 4(*a*) shows that the atomization is rapidly promoted by supplying the air 103. The portion P shown in the figure represents the operating point used during the period (several tens seconds) after starting operation of the internal combustion engine 1 in the present embodiment, and, at this point, the average droplet size of the fuel spray 7 is smaller than 10 μm. At that time, the amount of the air flow 103 flowing through the bypass flow passage 13*a* is about 1/10 of the total air flow controlled by the ISC valve 14. Therefore, the amount of the remaining intake air 104 can be effectively used for dragging and carrying the fuel spray 17.

Further, as shown in FIG. 4(*b*), the number of droplets in the fuel spray 17 having a droplet size above 20 μm is only several percentage relative to the total number of the droplets. For example, the required time that a droplet of 20 μm becomes a suspendable droplet of 10 μm is 0.01 second under the conditions of a fuel temperature of 20° C., and an atmosphere of still air of 20° C. When the air velocity is 5 m/s, the traveling distance of the droplet until the droplet size becomes 10 μm is 5 cm. In the construction of the present embodiment, the number of droplets which reach the surface of the heater 18 can be substantially reduced. That is, when the fuel spray 17 having a droplet size distribution shown in FIG. 4(*b*) is supplied, most of the droplets are carried on the carrier air 104 to the downstream side of the heater. Even if the droplets are attached onto the heater 18, they are instantaneously vaporized because of the small droplet size.

As clear from the above description, according to the intake air control device of the present embodiment, the following characteristics can be obtained.

(1) As the assembly pipe fuel injector 15, a fuel injector of the upstream swirl type promoting atomization by adding swirl to the fuel inside of the nozzle is employed.

(2) By assisting collision of air with the fuel injected from the assembly pipe fuel injector 15, the atomization is further promoted.

(3) The amount of air 103 for atomization supplied to the assembly pipe fuel injector 15 is set to about 1/10 of the total amount of air required for operating the internal combustion engine 1 during warming-up operation.

(4) The remaining air 104 is used for carrying the fuel spray 17, and flows so as to not cool the heater 18.

(5) Most of the fuel spray 17 injected from the assembly pipe fuel injector 15 is carried by the air flow flowing in the intake air pipe.

(6) By constructing the second fuel injector, including the bypass flow passages 13*a*, 13*b* in the body 11 of the intake air control device 110 containing the throttle valve 4 as a one-piece structure to form a unit, the device is made small in size.

(7) Since the fuel vaporizer having the heater 18 is constructed to be used as an auxiliary device, the heater 18 may be eliminated when the amount of fuel reaching the heater 18 is little.

(8) The load of the heater 18 is substantially decreased, and accordingly, the heater can be made small in size.

(9) The mounting ability of the intake air control device to the internal combustion engine is improved, and the productivity and the cost are largely improved compared to the conventional intake air control device.

Although the present embodiment uses a PTC heater for the heater 18, an ordinary heater, such as an electric heat coil, may be used if temperature control is performed by using a current control circuit. Further, although the number of the carrier air passages 45 is set to 4, the purpose for this is to supply the air into the main passage 12 as uniformly as possible. Therefore, the number of carrier air passages 45 is not limited to a specific number.

Operation of the fuel injector 110, when it is mounted on the internal combustion engine 1, will be described with reference to FIG. 1 and FIG. 5 to FIG. 7.

Referring to the internal combustion engine 1 shown in FIG. 1, as the internal combustion engine 1 is operated, the intake pipe (the intake assembly pipe 6, the intake manifold 7, the intake port 8) downstream of the throttle valve 4 becomes a negative pressure. The air is sucked from the outside by the negative pressure. At the time of starting operation and during idling operation, the throttle valve 4 is nearly in the fully closed condition, and the flow rate of the intake air in that state is controlled by the ISC valve 14 arranged in the bypass flow passage 13. The flow of the intake air at that time is schematically illustrated by the hollow arrows in FIG. 1.

The air 100 sucked from the outside is filtered by an air cleaner (not shown in figure), the flow rate is measured by the air flow sensor 3, and then the air reaches the upstream side of the throttle valve 4. A very small part of the intake air 100 flows into the main passage 12 downstream of the throttle valve 4 through the small gap between the throttle valve 4 and the inner peripheral wall surface of the main passage 12 (the arrow 102). On the other hand, most of the intake air 100 flows from the upstream side of the throttle valve 14 into the bypass flow passage 13 through the ISC valve 14 (the arrow 101), and then the flow is split into two flows, which flow in the bypass flow passages 13a, 13b to the main passage 12.

Therein, at the time of starting operation of the internal combustion engine 1 and during a predetermined period after starting, switching control between the assembly pipe fuel injector 15 and the port fuel injector 10 is performed. The control method will be described with reference to FIG. 7(a).

At the time of starting operation of the internal combustion engine 1, until the first explosion occurs in the combustion chamber 25, or until the rotation speed of the internal combustion engine 1 reaches a preset rotation speed, fuel is injected by operating the port fuel injector 10. After that, operation of fuel injection by the port fuel injector 10 is stopped and the operation is switched to fuel injection by the assembly pipe fuel injector 15. At that time, fuel injection from the assembly pipe fuel injector 15 is performed by starting operation of the assembly pipe fuel injector 15 overlapping with the operating period of the port fuel injector 10 by a time period $\Delta T1$. During the time period $\Delta T1$, fuel is injected from both of the port fuel injector 10 and the assembly pipe fuel injector 15. The overlap time $\Delta T1$ is a transport lag time until the fuel injected from the assembly pipe fuel injector 15 reaches the combustion chamber 25.

By providing the overlap time $\Delta T1$, it is possible to eliminate a difference in torque generated by the internal combustion engine 1 caused at the switching time. The magnitude of the overlap time $\Delta T1$ varies depending on the volume of the intake pipe downstream of the assembly pipe fuel injector 15 and the rotation speed of the internal combustion engine 1, and it is preferable that the value of the overlap time $\Delta T1$ is increased as the volume is larger or as the rotation speed is slower. Particularly, the difference in the generated torque can be made even smaller by adding a correction corresponding to the rotation speed, that is, by causing the overlap time $\Delta T1$ to be set to a larger value when the rotation speed is low, and the overlap time $\Delta T1$ to be set to a smaller value when the rotation speed is high.

Further, by starting current supply to the heater prior to fuel injection from the assembly pipe fuel injector 15, the temperature of the heater at the time of starting fuel injection from the assembly pipe fuel injector 15 can be preheated up to a temperature required to vaporize the fuel. Therefore, vaporization of the fuel can be promoted.

Operation of fuel injection of the assembly pipe fuel injector 15 is continued for a predetermined period. For example, it is preferable that operation of fuel injection of the assembly pipe fuel injector 15 is continued during the warming-up period of the internal combustion engine 1, that is, until the temperature of the cooling water of the internal combustion engine 1 becomes a preset temperature. The purpose of fuel injection by the assembly pipe fuel injector 15 is to activate the ternary catalyst converter 24 in a short time by warming-up. In a case where a sensor for detecting the temperature of the ternary catalyst converter 24 or a sensor for detecting the temperature of the exhaust gas that has passed through the ternary catalyst converter 24 is provided, it is preferable that operation of the fuel injection of the assembly pipe fuel injector 15 is continued until the temperature detected by the sensor rises up to a preset temperature.

After completion of the warming-up of the ternary catalyst converter 24, operation of fuel injection by the assembly pipe fuel injector 15 is stopped and the operation is switched to provide fuel injection by the port fuel injector 10. At that time, a time period $\Delta T2$ in which operation of fuel injection by both of the fuel injectors is stopped is provided between stopping of fuel injection by the assembly pipe fuel injector 15 and starting of fuel injection by the port fuel injector 10. By doing so, it is possible to eliminate a difference in torque generated by the internal combustion engine 1 caused at the switching time. Similar to the overlap time $\Delta T1$, the period time $\Delta T2$ is also a transport lag time until the fuel injected from the assembly pipe fuel injector 15 reaches the combustion chamber 25. Similarly to the overlap time $\Delta T1$, it is preferable that the magnitude of the period time $\Delta T2$ is controlled depending on the volume of the intake pipe downstream of the assembly pipe fuel injector 15 and the rotation speed of the internal combustion engine 1.

By performing the switching of the operation of fuel injection between the port fuel injector 10 and the assembly pipe fuel injector 15, the following effects can be obtained. That is, by injecting fuel from the port fuel injector 10 at the time of starting operation of the internal combustion engine 1, the time required for starting operation can be shortened compared to the case where starting operation of the internal combustion engine 1 is performed by operation of fuel injection using only the assembly pipe fuel injector 15. This is because the fuel injected from the port fuel injector 10 can be quickly sucked into and burned in the combustion chamber 25 of the internal combustion engine 1. Therefore, the starting operation time can be shortened by a time period corresponding to the transport lag time until the fuel injected from the assembly pipe fuel injector reaches the combustion chamber 25.

A method of further promoting atomization of fuel, by a method of supplying an opening-and-closing valve control signal during fuel injection by the assembly pipe fuel injector 15, will be described with reference to FIG. 7(b) and FIG. 7(c).

Figure 7A:
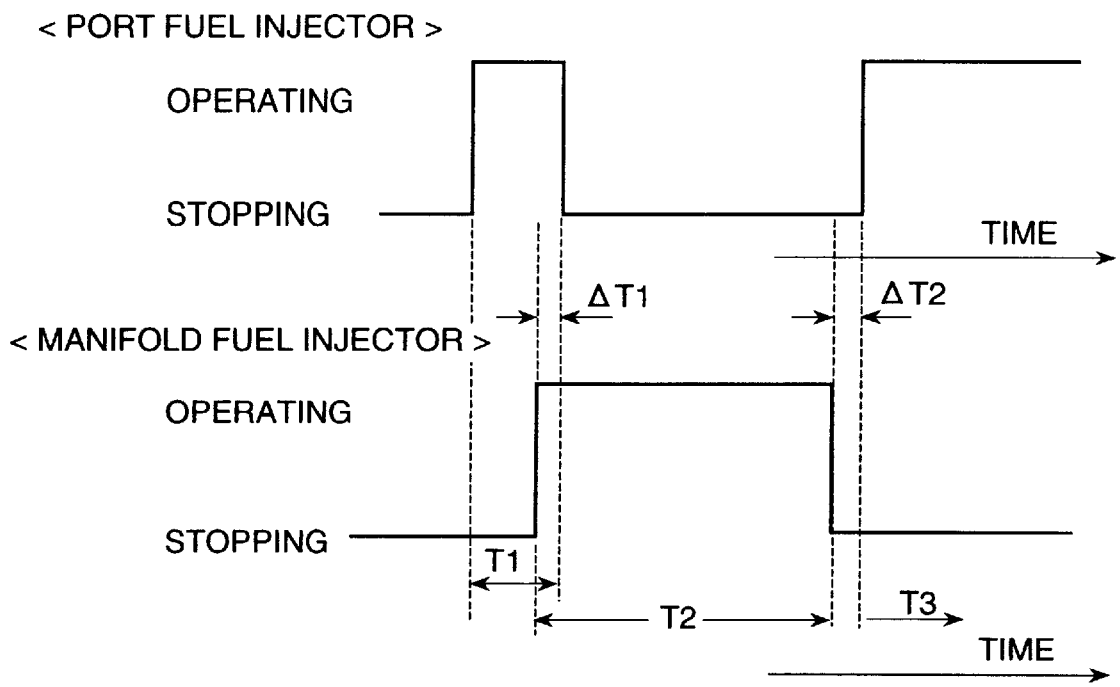
Figure 7B:
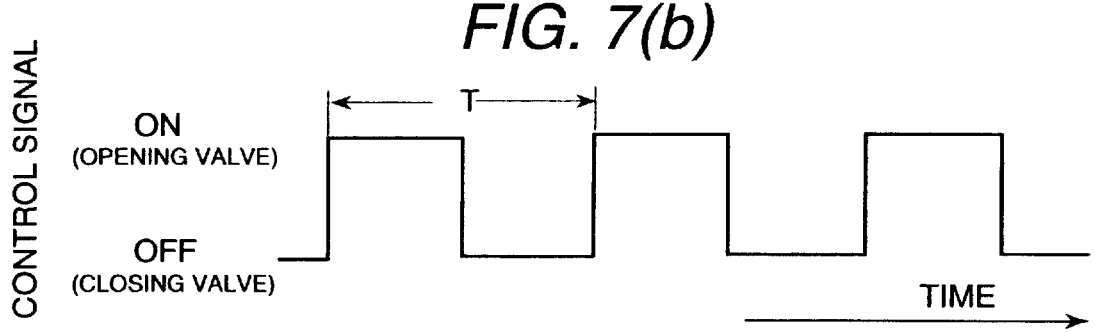

In FIG. 7(b), an opening valve control signal of the assembly pipe fuel injector is repeated with a given cycle T. The given cycle here means, for example, a cycle in synchronism with the top dead point in the intake stroke of each cylinder of the internal combustion engine 1. Since the amount of fuel injected from the assembly pipe fuel injector 15 is nearly in proportion to the time duration of the opening valve control signal, a control signal having a long opening-valve time is supplied when the amount of injected fuel is increased, and a control signal having a short opening-valve time is supplied when the amount of injected fuel is decreased. That is, the amount of injected fuel is controlled by duty control of the control signal, and one period of continuous fuel injection is performed during the given cycle T and the gas-liquid ratio during the fuel injection is constant.

Figure 7C:
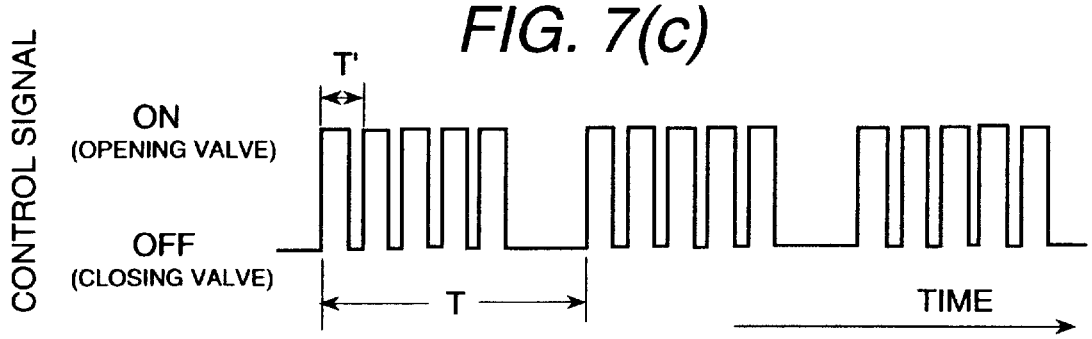

On the other hand, in FIG. 7(c), plural times of fuel injection are intermittently performed during the cycle T though the amount of fuel injected from the assembly pipe fuel injector 15 during the cycle T is equal to the amount of FIG. 7(b). The gas-liquid ratio during fuel injection in this case becomes equal to that of FIG. 7(b). However, since the air from the circular hole 46 continues to flow during closing-valve moment after a short injection, the ratio of air supplied to the fuel becomes larger compared to that in the case of FIG. 7(*b*) when a cycle T' is taken into consideration. That is, the amount of air mixed with the fuel can be increased by performing intermittent injection; and, as the result, the atomization of the fuel by air can be further promoted, and the carrying power of fuel by air can be increased. Therein, considering the signal supplied to the assembly pipe fuel injector 15, a short cycle ON-OFF signal compared to a cycle of ON-OFF of the control signal supplied to the port fuel injector 10 can be observed when the rotation speed of the internal combustion engine 1 is the same.

Figure 5A:
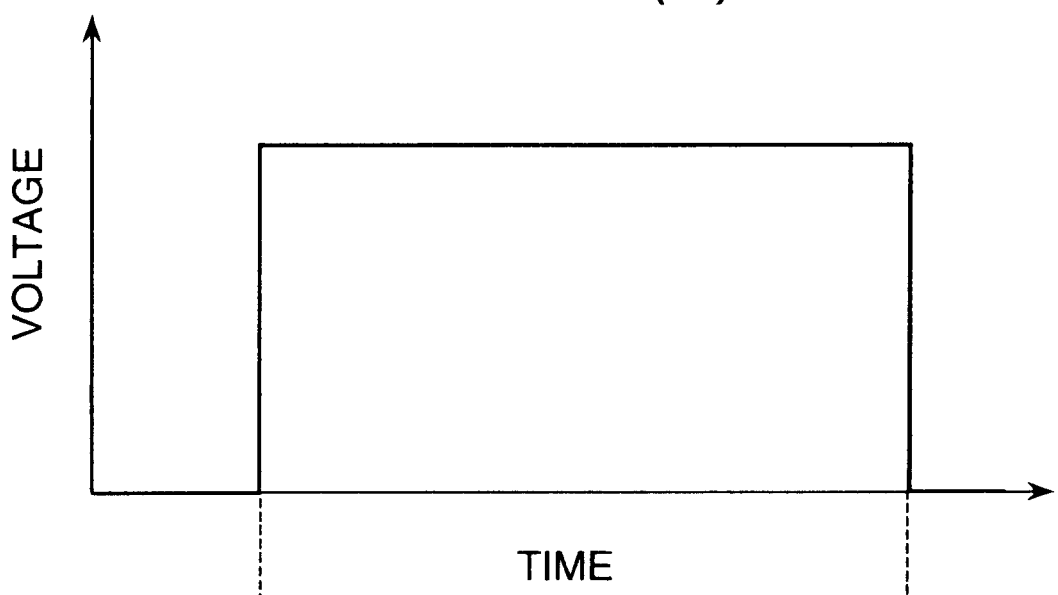
Figure 5B:
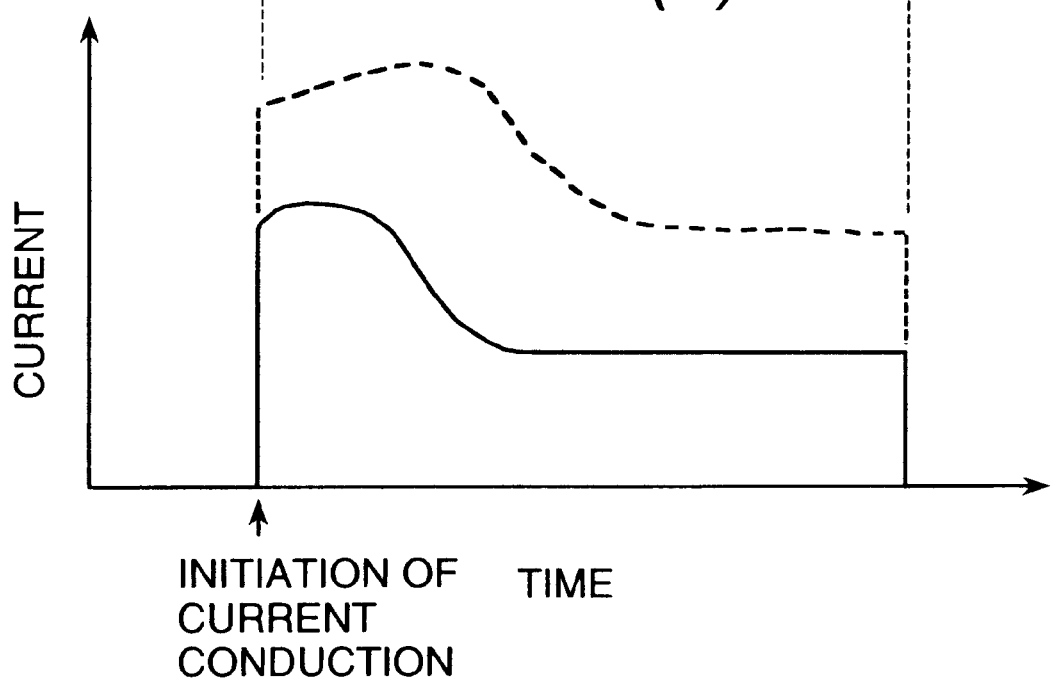

As shown in FIG. 5(*a*), a constant voltage is applied to the heater 18 from the battery and the generator, such as an alternator or the like. Current flowing in the heater 18 varies with time, as shown in FIG. 5(*b*). That is, since a PCT heater is used as the heater 18 in the present embodiment, when the temperature of the heater 18 is low just after starting current supply, the resistance value of the heater 18 is small and a large current flows in the heater 18. Since the resistance of the heater 18 is acceleratively increased as the temperature of the heater 18 is raised, the current is decreased after reaching its peak, and finally settles to a current value in which an amount of heat is generated which balances the amount of heat removed from the heater 18. The solid line in FIG. 5(*b*) indicates the time variation of current flowing in the heater 18 obtained by the effect obtained by the present embodiment. The characteristic will be described below, comparing to that of the conventional device shown by the dotted line in the figure.

(1) Since the heater is made small in size to reduce the heat capacity of the heater itself, the peak current can be reduced. Further, the current can reach the peak current in a short time (that is, the heater temperature can be raised in a short time). Furthermore, since the surface area of the heater 18 is made small so as to reduce the amount of heat radiated from the area, the electric current can be reduced by that amount.

(2) Since atomization of the fuel spray can be promoted and the most of the fuel spray can be carried by the air, an amount of fuel reaching the heater 18 can be reduced and the heater current corresponding to the latent heat of vaporization can be reduced.

(3) Since the large amount of air flowing out from the carrier air passages 45 to the main passage 12 is prevented from directly hitting against the heater, the amount of heat removed by the air can be reduced and the electric current can be reduced by that amount.

(4) Since the projecting portion 20 is arranged upstream of the heater 18 so that the air flowing from upstream of the heater 18 may not directly hit against the heater 18, the amount of the heat removed by the air can be reduced and the electric current can be reduced by that amount.

(5) Since the thermal insulator 19 is arranged in order to reduce the amount of heat transferred from the heater 18 to the wall surface of the main passage 12, the electric current can be reduced by that amount.

Further, if the body 11 forming the main passage 12 is made of a resin and not a metal, the heater current can be further reduced because the heat transfer to the main passage 12 can be reduced.

Figure 6A:
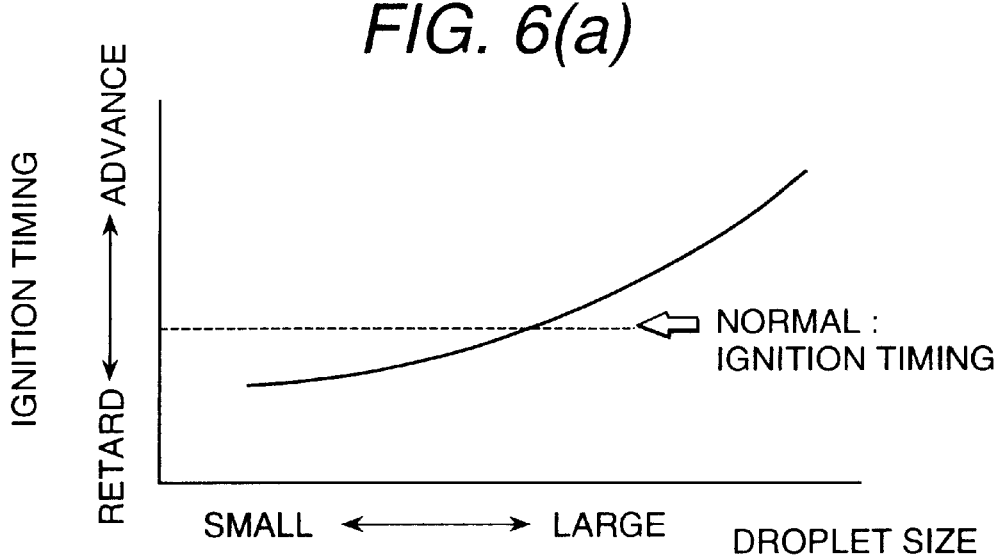
Figure 6B:
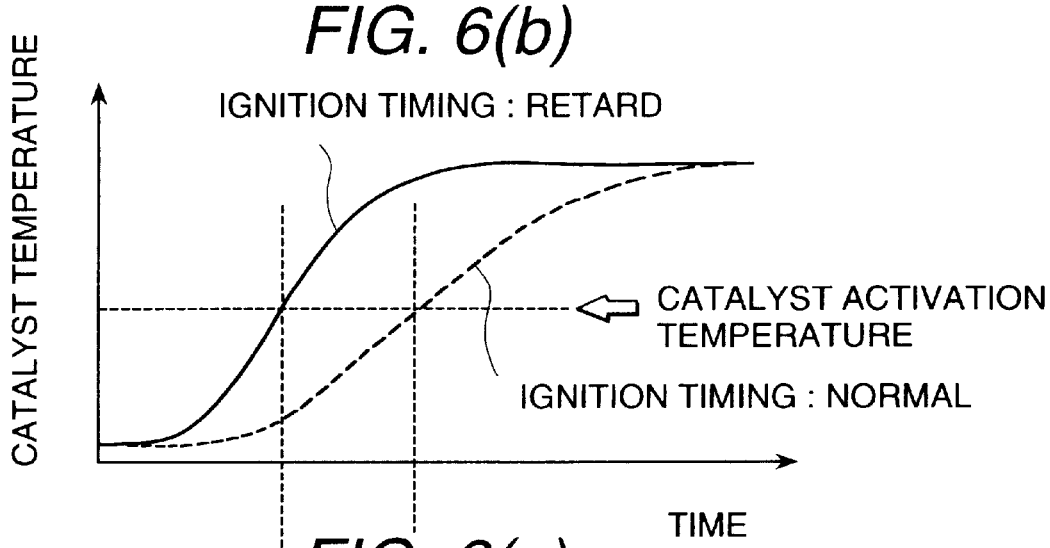
Figure 6C:
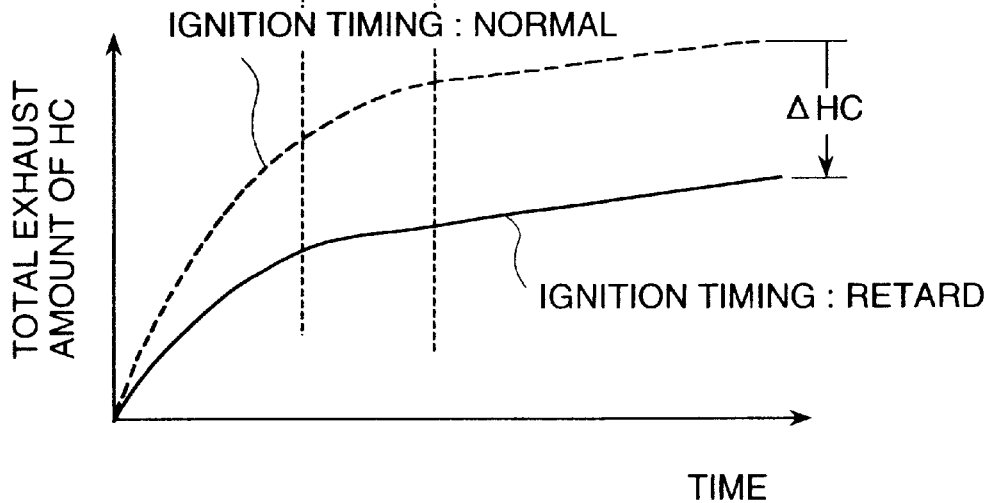

FIG. 6(*a*) is a graph showing the relationship between droplet size in the fuel spray and the limit of delaying (retarding) ignition timing while the stability of combustion is maintained. Since the droplet size of the fuel spray obtained in the present embodiment is very small, the ignition timing can be largely retarded before the expansion stroke is started. Since the expansion ratio of the burned gas inside the combustion chamber is reduced if ignition is performed in the expansion stroke, the amount of heat consumed by the expansion work of the burned gas is reduced, and, accordingly, the burned gas at a high temperature can be exhausted to the exhaust pipe. That is, as shown in FIG. 6(*b*), the ternary catalyst converter 24 can be rapidly warmed up by exhausting high temperature burned gas by retarding the ignition timing, and the time after starting operation of the internal combustion engine 1 until the temperature of the ternary catalyst converter 24 reaches the activation temperature can be shortened.

That is, as shown in FIG. 6(*c*), since the cleaning effect of the ternary catalyst converter 24 is early started at an early stage, the amount of exhausted HC after starting operation of the internal combustion engine 1 can be substantially reduced. In addition to HC, the amount of exhausted NOx and CO can be also reduced by shortening the warming-up period of the ternary catalyst converter (catalyst) 24.

Further, the assembly pipe fuel injector 15 is a fuel injector in which the fuel injection hole is exposed in the depth of the recessed portion 161 opening into the area downstream of the throttle valve 4 of the main passage 12 in the body 11 in the intake air control device 110 mounted at a position upstream of the intake assembly pipe 6. Therefore, the fuel spray 17 injected from the assembly pipe fuel injector 15 is sufficiently promoted in atomization while passing through the inside of the recessed portion 161, and distribution of the fuel spray 17 to each of the cylinders can be made uniform since the distance for promoting mixing with the intake air and for atomizing before reaching each of the cylinders becomes longer.

A second embodiment in accordance with the present invention will be described with reference to FIGS. 8(*a*) and 8(*b*).

Figure 2C:
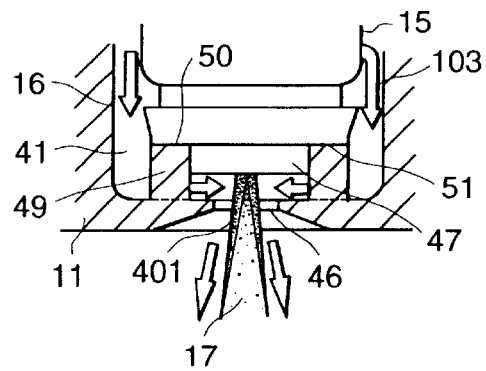
FIG. 2(c) is an enlarged sectional view showing the front end portion of the fuel injector.

A main difference between the second embodiment and the first embodiment shown in FIG. 2(*a*) is in the provision of a bypass flow passage 13*c* through which the air for carrying the fuel spray flows. The other features of the construction are the same as those of the first embodiment; therefore, an overlapped explanation will be omitted.

In this embodiment, the bypass flow passage 13*c* is branched at a branch inlet portion 43*a* and communicates with a branch outlet portion 60*a* formed in the body 11 so as to project into the main passage 12 between the throttle valve 4 and the recessed portion 161. The branch outlet portion 60*a* is opened in a direction toward the downstream side in the axial flow direction of the main passage 12. That is, the air 104 flowing out from the branch outlet portion 60*a* collides (merges) with the fuel spray 17 promoted in atomization in the recessed portion 161 as it is injected from the circular hole 46 at the portion of the fuel spray 17 flowing out to the main passage 12. At that time, the air 104 flowing out from the branch outlet portion 60*a* is mostly composed of the air flowing through the ISC valve 14, of which the flow rate is large, and constitutes flow directed to the downstream side in the axial flow direction of the main passage 12.

Therefore, the fuel spray 17 is transported by being diverted in the downstream direction of the main passage 12. The small size droplets among the fuel spray 17 can be transported in the downstream direction past the heater by being carried along with the flow of the air 104. On the other hand, very large size droplets among the fuel spray 17 attach to the heater 18 without being affected by the flow of air 104.

However, the amount of the fuel reaching the heater 18 is very small, and, accordingly, the heater 18 can be made small in size or can be eliminated.

A third embodiment in accordance with the present invention will be described with reference to FIGS. 9(a) to 9(c).

The main difference between the third embodiment and the first embodiment shown in FIG. 2(a) is that, instead of the throttle valve 4 being linked to the accelerator operation of a driver, an electronic control throttle valve (hereinafter, referred to as ETC) 52 for electrically controlling the opening degree is provided, and, accordingly, the ISC valve 14 is eliminated. When the ETC valve 52 is used, the amount of intake air at the time of the starting operation of the internal combustion engine 1 and during idling operation can be controlled without using the ISC valve 14. Therefore, the ISC valve 14 is unnecessary. Further, the construction of the carrier air passage 45a is changed, as will be described later. The other features of the construction are the same as those of the first embodiment. Therefore, an overlapped explanation will be omitted here.

In this embodiment, the assembly pipe fuel injector 15, the circular hole 46 and the recessed portion 161 are arranged in the body 11b so that the center shaft of the assembly pipe fuel injector 15 is included in a plane formed by the rotating shaft 53 of the ETC valve 52 and the axis of the main passage 12. Further, the heater 18 is located at a portion where the fuel injected from the assembly pipe fuel injector 15 reaches; that is, it is placed on the inner wall surface of the main passage 12 near a point where a line extending along the center axis (the valve shaft center) of the assembly pipe fuel injector 15 intersects with the wall surface of the main passage 12. These intersecting points are included in the plane formed by the rotating shaft 53 of the ETC valve 52 and the axis of the main passage 12.

Therein, the ETC valve 52 is always opened at the start of operation and during operation of the internal combustion engine 1, though the opening degree is varied.

Figure 9A:
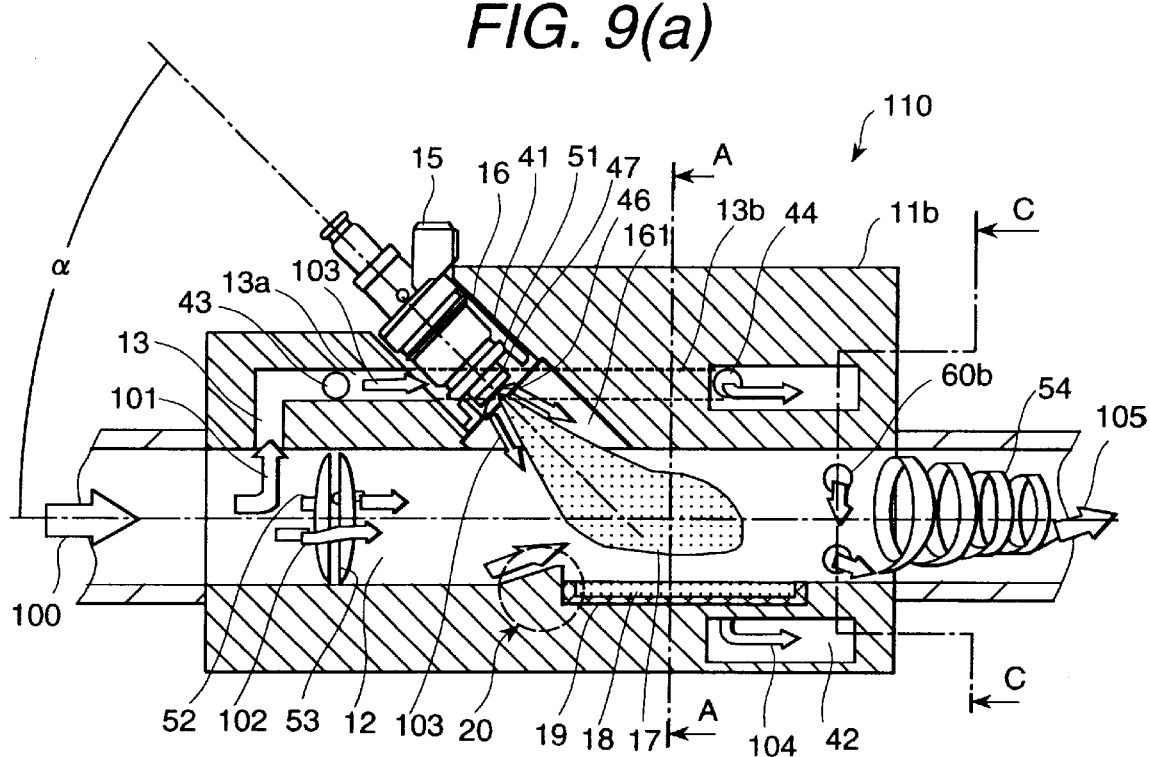
FIG. 9(a) is a vertical cross-sectional view of the portion 110 according to a third embodiment of the intake air control device in accordance with the present invention.
Figure 9B:
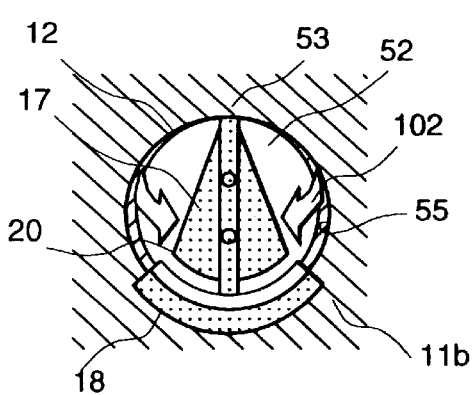
FIG. 9(b) is a cross-sectional view taken on the plane of the line A—A of FIG. 9(a)

As shown in FIG. 9(b), of the air 102 passing through the ETC valve 52, a large amount of flow passes through the central portion of the ETC opening portions 55 and a very small amount of flow passes through the portion where the rotating shaft 53 of the ETC valve 52 is located. Therefore, when the heater 18 is placed at a position downstream of the main passage 12 near the plane including the rotating shaft 53, the amount of air 102 hitting against the heater 18 becomes small so as to reduce the amount of heat removed from the heater 18 by the air 102, and, accordingly, the electric power consumed by the heater 18 can be reduced.

Further, with such a construction, since the distribution of air between the air 101 flowing through the bypass flow passage 13 and the air 102 flowing through the ETC opening portion 55 of the ETC valve 52 can be controlled by the opening degree of the ETC valve 52, it is possible to control the distribution ratio of the amount of fuel injected from the assembly pipe fuel injector 15 and the amount of air flowing out from the circular hole 46 where the assembly pipe fuel injector 15 is placed. For example, when the opening degree of the ETC valve 52 is slightly increased, the amount of air 101 flowing through the bypass flow passage 13 is decreased. Since the ratio of the amount of air 103 to be mixed with the fuel is varied as described above, the condition of atomization and the condition of vaporization of the fuel spray 17 can be changed. That is, the condition of atomization and the condition of vaporization can be controlled depending on the operating condition of the internal combustion engine 1.

Figure 9C:
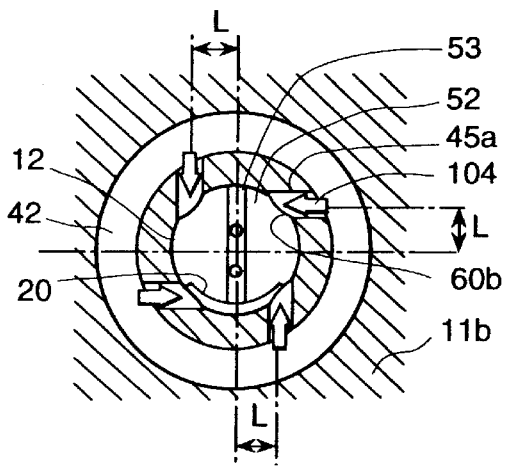
FIG. 9(c) is a cross-sectional view taken on the plane of the line C—C of FIG. 9(a)

As shown in FIG. 9(c), the opening portions of the carrier air passages 45a in the present embodiment are arranged with an offset by a distance L from the central axis of the main passage 12. By doing so, the air 104 flowing out to the main passage 12 from the carrier air passage 45a through the outlet portions 60b is diverted along the curved inner wall surface of the main passage 12 to form a swirl flow 54. At that time, since the pressure in the center of the swirl 54 is decreased, the fuel spray 17 which has been injected from the assembly pipe fuel injector 15 and which has passed through the atomizing air outlet 46 and the air 103 are drawn toward the low-pressure center of the swirl flow 54 so as to be transported thereby.

With this construction, since the effect of drawing the fuel spray 17 to the central axis of the main passage 12 is stronger than that of the case where carrier air passages 45 are arranged opposite to each other inside the main passage 12, it is easy to prevent the fuel spray 17 from adhering onto the wall surface of the main passage 12.

The construction which applies a swirl flow to the carrier air 104 need not necessarily be combined with the use of the ETC valve 52, but it can also be applied to the case where the ISC valve is used, as in the first embodiment.

A fourth embodiment in accordance with the present invention will be described with reference to FIGS. 10(a) and 10(b).

In the fourth embodiment, although the ETC valve 52 is placed in the main passage 12 similar to the first embodiment, the differences between the fourth embodiment and the first embodiment are that a curved surface portion 201 for constructing an air flow passage for the ETC valve 52 is formed in the main passage 12, and that a water jacket 301 for recirculating cooling water 300 is arranged around the heater 18 in the main passage 12, and that the thermal insulator 19 provided on the back surface of the heater 18 is eliminated. The other features of the construction are the same as those of the first embodiment. Therefore, an overlapped explanation will be omitted here.

In this embodiment, the assembly pipe fuel injector 15, the circular hole 46 and the recessed portion 161 are arranged in the body 11c so that the center shaft of the assembly pipe fuel injector 15 is included in a vertical plane through the center axis of the main passage 12 and intersects with the plane formed by the rotating shaft 53 of the ETC valve 52

The function of the curved surface portion 201 will be described in more detail. The ETC passage portion 55a is formed so that the passage between the curved surface portion 201 of the main passage 12 (the inner wall surface of the maim passage 12) and the ETC valve 52 may be closed until the opening degree of the ETC valve 52 exceeds a given opening degree. The ETC passage portion 55a is formed on the recessed portion 161 side (the side where the assembly pipe fuel injector 15 is provided) in the main passage 12.

The inner wall surface of the main passage 12 on the opposite side is formed so as to have a gap with the locus of an outer peripheral surface of the ETC valve 52 for performing opening and closing operation of the curved surface portion 201, which has a curvature nearly equal to the rotating locus of the outer shape of the ETC Valve 52 during opening and closing using a rotating shaft 53 as the axis. By doing so, the ETC valve 52 in the opposite side does not form any substantial air passage until the given opening degree.

At the time of the starting operation and during warming-up operation of the internal combustion engine 1, the amount of intake air is controlled mainly using the ETC passage portion 55a. Further, since the ETC passage portion 55a is formed on the recessed portion 161 side, the air 102 passing through the ETC passage portion 55a collides with the fuel spray 17 at the portion where the fuel spray, that is injected from the circular hole 46 and is atomized further inside the recessed portion 161, flows out to the main passage 12, and diverts and transports the fuel spray 17 toward the downstream side of the main passage 12. Therefore, the amount of the fuel spray 17 reaching (adhering onto) the heater 18 becomes very small.

Operation of the water jacket 301 arranged around the heater 18 inside the body 11c will be described in more detail. In an operating region, such as during hard acceleration, high speed running or the like, i.e. in operating conditions other than the starting operation and 0 during the warming-up operation, of the internal combustion engine 1, a large amount of fuel is required. At that time, the atomization-promoted fuel spray 17 is injected from the assembly pipe fuel injector 15 together with the injection of fuel from the port fuel injector 10. The temperature of the cooling water 300 recirculating in the water jacket 301 arranged around the heater 18 is heated up to several tens °C. after warming-up of the internal combustion engine 1, and vaporization of the fuel can be promoted by using this heat. Therefore, current supply to the heater 18 is not required so much, and, accordingly, the capacity of the heater 18 can be reduced.

The amount and the velocity of intake air flowing in the intake pipe including the main passage 12 during hard acceleration and high speed running are very large and very high compared to the amount and velocity of the intake air required for the starting operation and during warming-up operation of the internal combustion engine 1. Therefore, the fuel spray 17 injected from the assembly pipe fuel injector 15, which is promoted in atomization, and the vaporized fuel can be efficiently transported to the combustion chambers 25.

The embodiment in which the water jacket 301 is arranged around the heater 18 to recirculate the cooling water 300 can be applied to all the embodiments of the present invention. Further, in the present embodiment, although the intake air 101 of the bypass flow passage 13 is divided into flows of intake air 103 and 104, it is possible to provide an arrangement in which all the intake air 101 is supplied to the pressure regulation chamber 41 to be used only for the atomization of the fuel spray 17, without forming the bypass flow passage 13b, the pressure regulation chamber 42 and the carrier air passage 45. By doing so, it is possible to provide an intake air control device 11 which is simple in structure and excellent in productivity, while maintaining the level of atomization and carrying power of the fuel spray 17.

Figure 11A:
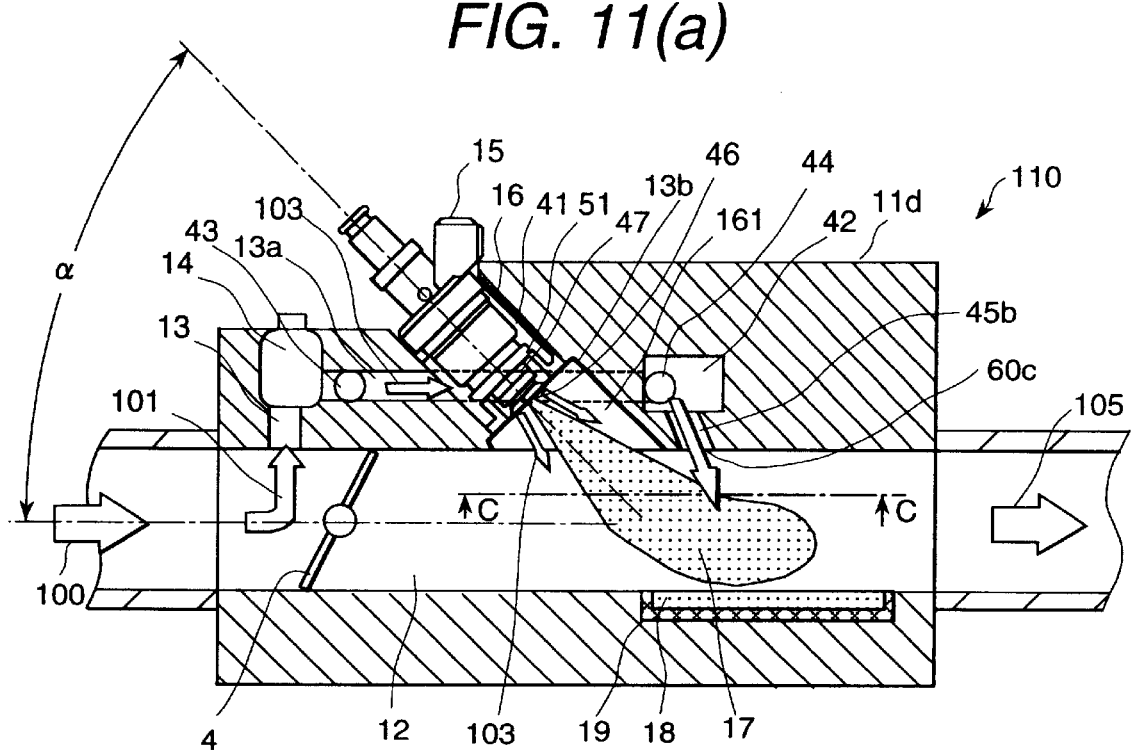
FIG. 11(a) is a vertical cross-sectional view of the portion 110 according to a fifth embodiment of an intake air control device in accordance with the present invention.
Figure 11B:
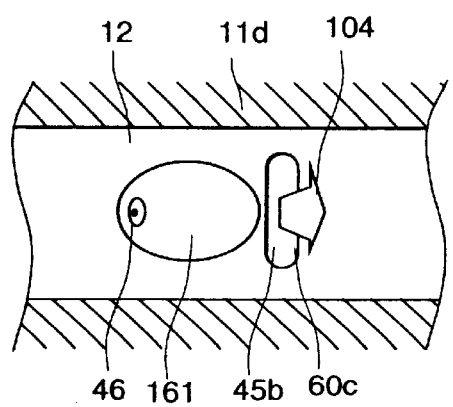
FIG. 11(b) is a cross-sectional view taken on the plane of the line C—C of FIG. 11(a).

A fifth embodiment in accordance with the present invention will be described with reference to FIGS. 11(a) and 11(b).

A main difference between the fifth embodiment and the first embodiment shown in FIG. 2(a) is that the carrier air passage 45 formed in the body 11 is modified, and the projecting portion 20 is eliminated. The other features of the construction are the same as those of the first embodiment. Therefore, an overlapped explanation will be omitted here.

In the present embodiment, the carrier air passage 45b connecting the pressure regulation chamber 42 with the main passage 12 in the body lid is formed to slant in the downstream direction by a given angle relative to the axial flow direction in the main passage 12, and the outlet portion 60c is formed so as to open toward the heater 18 arranged in the main passage 12. Further, the shape of the outlet portion 60c of the carrier air passage 45b is formed so as to have a desired shape and passage area, as shown in FIG. 11(b).

Therein, the outlet portion 60c is shaped as a long-ellipsoid, and the length of the major axis of the long-ellipse is nearly equal to the width of the heater 18 arranged in the main passage 12.

The heater 18 is placed inside the main passage on the downstream side of the throttle valve 4 and the downstream side of the assembly pipe fuel injector 15. Further, the projecting portion 20, which is arranged in the upstream side of the heater 18 in the main passage 12 in the first embodiment, is eliminated in this embodiment.

The fuel spray 17 injected from the assembly pipe fuel injector 15 is further atomized in the recessed portion 161 by the intake air 103 passing together through the circular hole 46, and the fuel spray 17 is supplied into the main passage 12 toward the heater 18.

On the other hand, the intake air 104 supplied to the main passage 12 from the pressure regulation chamber 42 through the carrier air passage 45b flows toward the heater 18 with a preset angle and velocity. As a result, most of the atomized fuel spray 17 is not attached onto the heater 18, but is transported to the combustion chambers 25 without adhering onto the inner wall surface of the main passage 12 and the inner wall surface of the intake pipe. On the other hand, by actively supplying the intake air 104 to the heater 18 with a preset velocity, very large droplets attached onto the surface of the heater 18 are efficiently vaporized by being expanded on the heater 18 and by increasing the heat transfer. The reason why the heat transfer is increased and the fuel is efficiently vaporized is that the fuel vaporized by the heater 18 is efficiently swept and transported by the intake air 104.

Further, since the projecting portion 20 is not formed on the upstream side of the heater 18 in the main passage 12, the intake air flowing from the upstream side is also supplied onto the surface of the heater 18, and the fuel vaporized by the heater 18 is actively swept and transported. That is, although the intake air 104 is actively supplied to the heater 18, the intake air 104 mainly expands the very large droplets attached onto the heater 18 along the surface of the heater 18 to vaporize the very large droplets, and works to sweep and transport the vaporized fuel. Therefore, an increase of the consumed electric power due to heat loss from the heater 18 due to the intake air 104 can be suppressed to a relatively small amount.

In the present embodiment, the electric power consumed by the heater 18 is slightly increased compared to that in the first to the fourth embodiments, but the other effects similar to those of the above-mentioned embodiments can be also obtained. Further, although the ISC valve 14 is used in the present embodiment, it is possible to use the ETC valve 52 for electrically controlling the valve opening degree to control the amount of intake air at the time of the starting operation and during warming-up operation of the internal combustion engine 1.

A sixth embodiment in accordance with the present invention will be described with reference to FIG. 12.

Figure 10A:
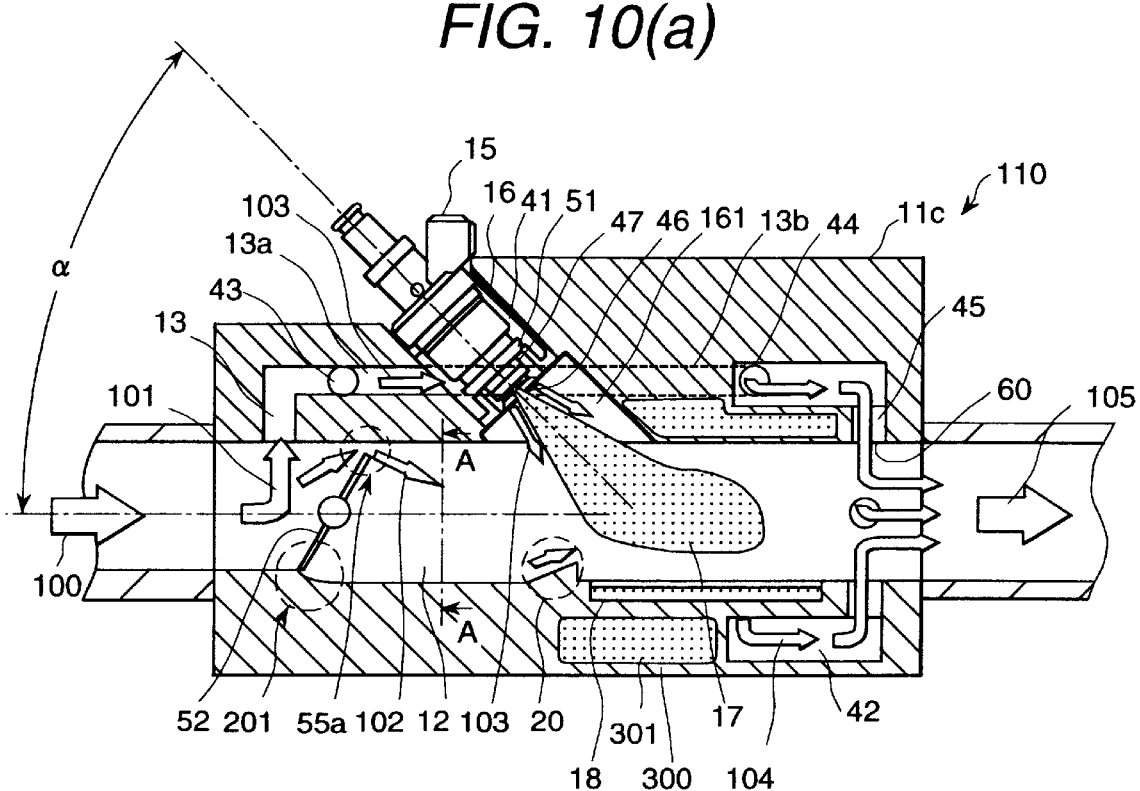
FIG. 10(a) is a vertical cross-sectional view of the portion 110 according to a fourth embodiment of an intake air control device in accordance with the present invention.
Figure 10B:
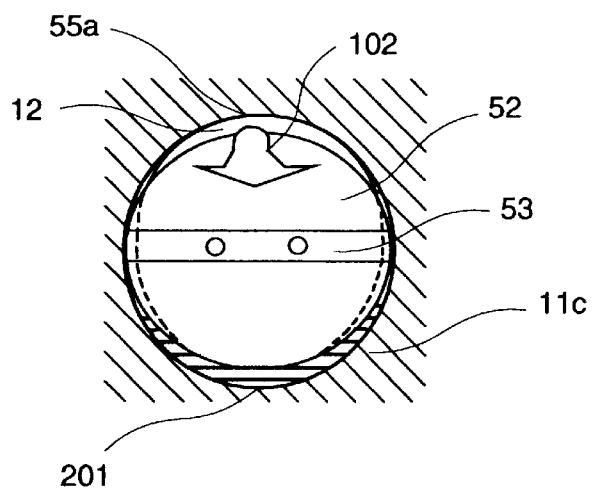
FIG. 10(b) is a cross-sectional view taken on the line A—A of FIG. 10(a)

In the sixth embodiment, the ETC valve 52 is placed in the main passage 12 of the body lie, similar to the fourth embodiment shown in FIG. 10(a). The difference between the sixth embodiment and the fourth embodiment are that a curved surface portion 201 is arranged on the recessed portion 161 side in the main passage 12 and the ETC passage portion 55b is formed on the heater 18 side, and that the pressure regulation chamber 42 downstream of the heater 18, the carrier air passage 45 and the water jacket 301 are eliminated, along with the projecting portion 20. The other features of the construction are the same as those of the fourth embodiment. Therefore, an overlapped explanation will be omitted here.

The fuel spray 17 injected from the assembly pipe fuel injector 15 is further atomized in the recessed portion 161 by the intake air 103 passing together with the spray through the circular hole 46, and the fuel spray 17 is supplied into the main passage 12 toward the heater 18. The intake air 102 passing through the ETC passage portion 55b formed on the upstream side of the heater 18 in the main passage 12 passes over the heater 18 with a desired flow speed. At that time, the atomization-promoted fuel spray 17 is transported downstream of the heater by the intake air 102 so as to be efficiently supplied to the combustion chamber 25. On the other hand, very large droplets not transported by the intake air 102 pass through the intake air 102 to attach onto the heater 18. Therefore, the amount of the fuel spray 17 attached onto the heater 18 is reduced.

The very large droplets not transported by the intake air 102 become attached onto the heater 18 and are vaporized. Therein, by actively supplying the intake air 104 to the heater 18 with a preset velocity, very large droplets attached onto the surface of the heater 18 are efficiently vaporized by being expanded on the heater 18 and by increasing the heat transfer. The reason why the heat transfer is increased and the fuel is efficiently vaporized is that the fuel vaporized by the heater 18 is efficiently swept and transported by the intake air 104.

In the present embodiment, since only the very large droplets of part of the fuel spray 17 attach onto the heater 18, the electric power consumed by the heater 18 can be suppressed to relatively small value. Therefore, compared to the other embodiments not directly supplying intake air to the heater 18, the electric power consumed by the heater 18 is increased a little, but the other effects similar to those of the above-mentioned embodiments can be similarly obtained.

Figure 13A:
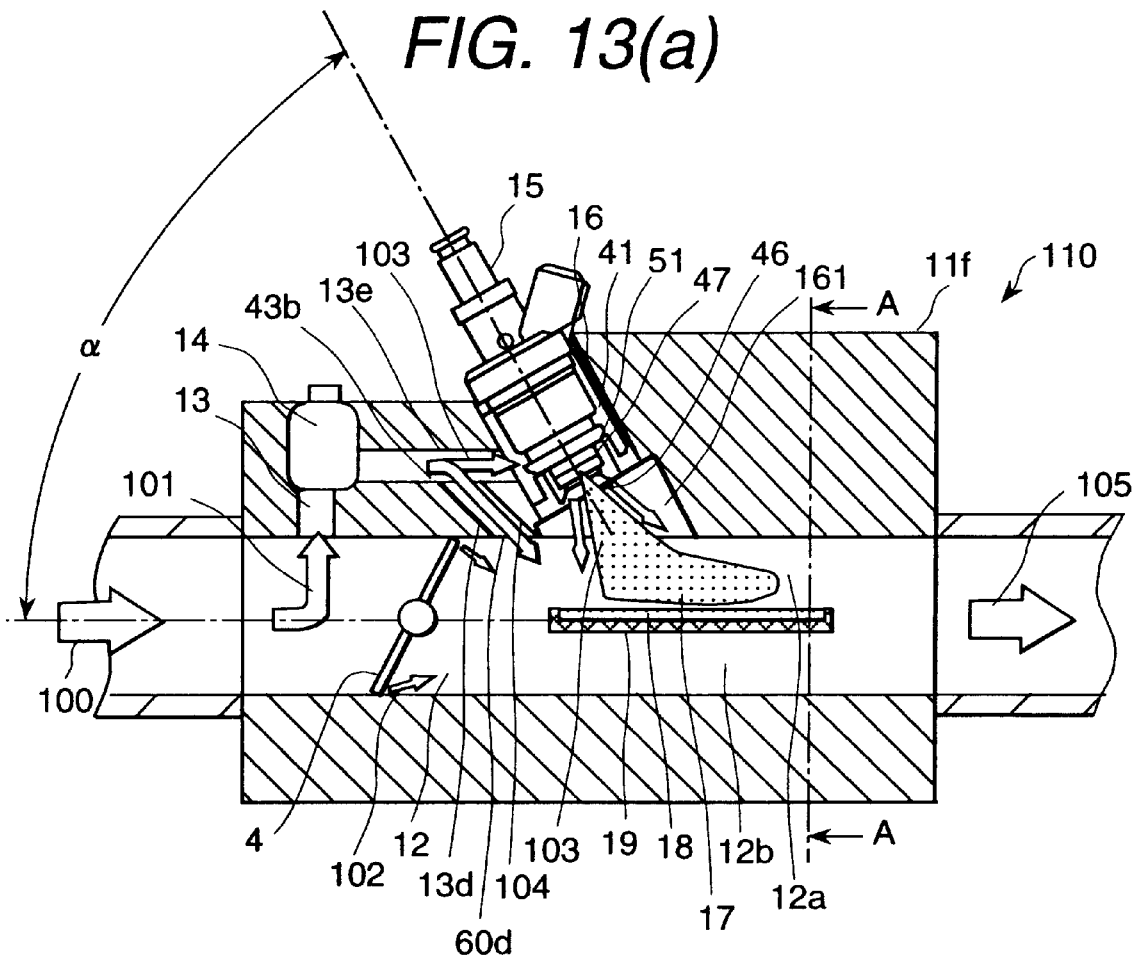
FIG. 13(a) is a vertical cross-sectional view of the portion 110 according to a seventh embodiment of an intake air control device in accordance with the present invention.
Figure 13B:
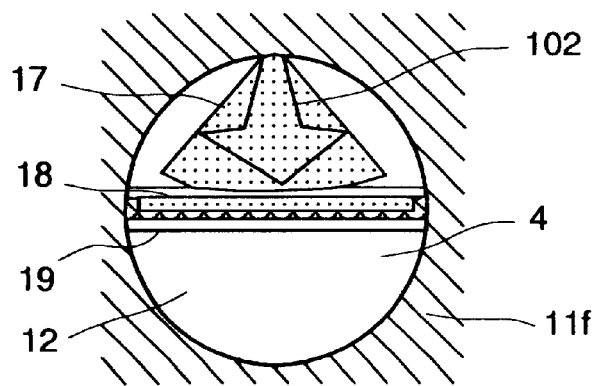
FIG. 13(b) is a cross-sectional view taken on the plane of the line A—A of FIG. 13(a).

A seventh embodiment in accordance with the present invention will be described with reference to FIGS. 13(a) and 13(b).

Figure 8A:
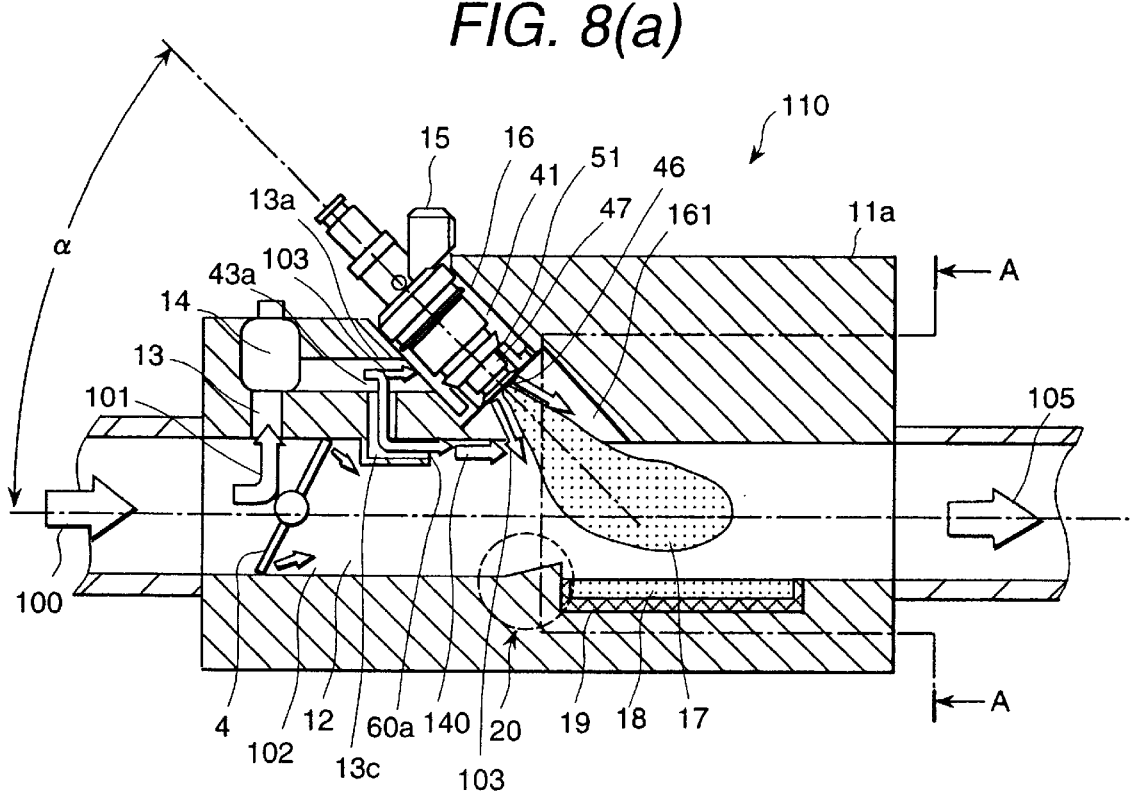
FIG. 8(a) is a vertical cross-sectional view of the portion 110 according to a second embodiment of an intake air control device in accordance with the present invention.
Figure 8B:
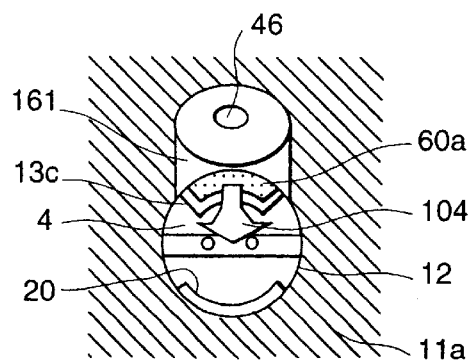
FIG. 8(b) is a cross-sectional view taken on the plane of the line A—A of FIG. 8(a)

A main differences between the seventh embodiment and the second embodiment shown in FIG. 8(a) relate to the structure of the bypass flow passage 13d for providing the air flow 104 to carry the fuel spray 17, and to the structures of the heater 18 for vaporizing the fuel spray 17 and the thermal insulator 19, and to the fact that the projecting portion 20 is eliminated. The other features of the construction are the same as those of the second embodiment. Therefore, an overlapped explanation will be omitted here.

In this embodiment, the bypass flow passage 13d, which branches at the branch inlet portion 43b in the body 11f, communicates with the branch outlet portion 60d formed in the main passage 12 between the throttle valve 4 and the recessed portion 161. The branch outlet portion 60d opens toward the heater 18. That is, the air 104 flowing out from the branch outlet portion 60d is jetted toward the heater 18. Since the heater 18 is formed together with the thermal insulator 19 in a one-piece structure and is covered by the thermal insulator 19 at its back surface, the heat generated by the heater 18 is not easily radiated from the thermal insulator 19 side, and so most part of the generated heat is dissipated from the surface of the heater 18 which is not covered by the thermal insulator 19. The heater 18 is arranged along the axis of the main passage 12 downstream of the throttle valve 4 so as to divide the main passage into a passage 12a on the recessed portion 161 side and a passage 12b on the side opposite to the passage 12a.

The intake air 104, the fuel spray 17 and the intake air 103 are supplied toward the heater 18, which is provided so as to face the passage 12a. Therefore, the velocity of the intake air 104, the fuel spray 17 and the intake air 103 becomes faster because the passage 12a is contracted compared to the passage area inside the main passage 12 on the downstream side. The fuel spray 17 directed toward the heater 18 in the passage 12a is effectively transported toward the downstream side of the main passage 12 by the intake air 104, which represents the major part of the intake air passing through the ISC valve 14.

Only the very large droplets not transported by the intake air 104 become attached onto the heater 18. By actively supplying the intake air 104 with a preset velocity, the very large droplets attached onto the surface of the heater 18 are efficiently vaporized by increasing the heat transfer. The reason why the heat transfer is increased and the fuel is efficiently vaporized is that the fuel vaporized by the heater 18 is efficiently swept and transported by the intake air 104. That is, the intake air 104 is actively supplied to the heater 18. However, since the very large droplets become attached onto the surface of the heater 18, the heat of the heater 18 is consumed in vaporization of the very large droplets (fuel) attached onto the surface thereof, thereby to decrease the ratio of heat consumed by being removed by the intake air 104. Therefore, the consumed electric power can be suppressed to a relatively small value.

Therefore, in the present embodiment, the electric power consumed by the heater 18 is slightly increased compared to that in the first to the fourth embodiments, but the other effects similar to those of the above-mentioned embodiments can be also obtained. Further, although the ISC valve 14 is used in the present embodiment, it is possible to use the ETC valve 52 for electrically controlling the valve opening degree to control the amount of intake air at the time of the starting operation and during warming-up operation of the internal combustion engine 1.

Further, in the present embodiment, the heater 18 is preferably arranged close to the throttle valve 4 side, and the fuel spray 17 can be more efficiently transported by supplying part of the intake air 102 leaking through a gap between the main passage 12 and the throttle valve 4 to the heater 18.

Figure 14:
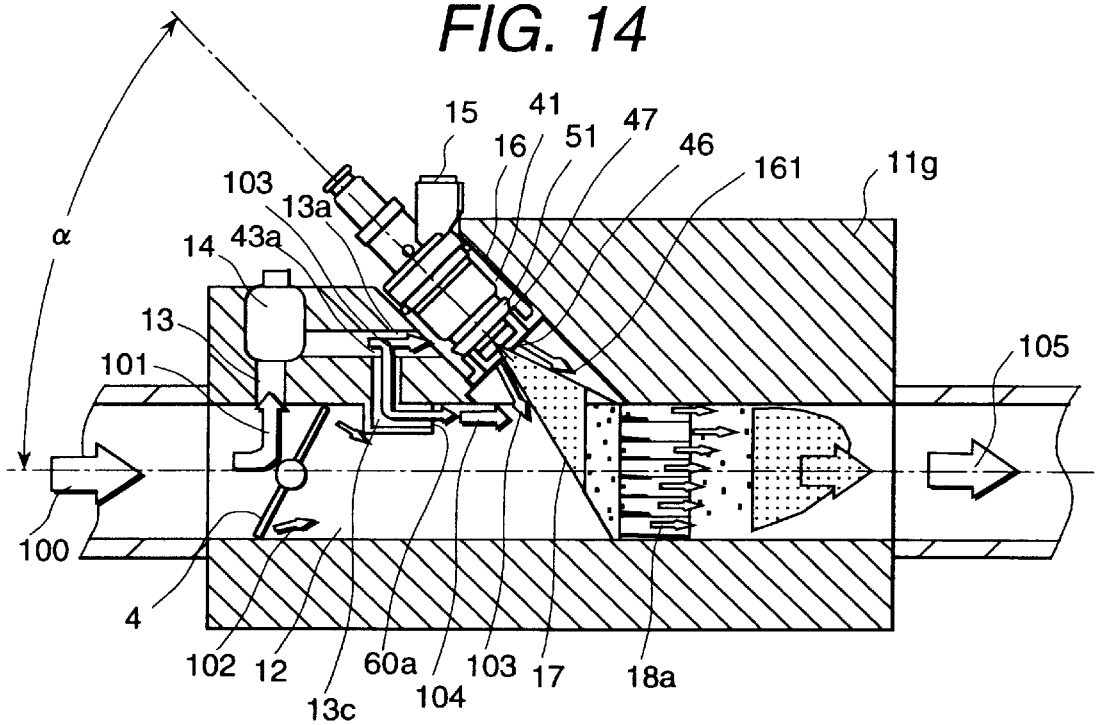
FIG. 14 is a vertical cross-sectional view showing the portion 110 according to a eighth embodiment of an intake air control device in accordance with the present invention.

An eighth embodiment in accordance with the present invention will be described with reference to FIG. 14.

The main differences between the eighth embodiment and the second embodiment shown in FIG. 8(c) relate to the structure of the heater 18a for vaporizing the fuel spray 17, and to the fact that the projecting portion 20 is eliminated. The other features of the construction are the same as those of the second embodiment. Therefore, an overlapped explanation will be omitted here.

In this embodiment, the heater 18a is composed of plate-shaped heaters, and a plurality of the plate-shaped heaters that are stacked with a predetermined spacing are arranged in the main passage 12 downstream of the recessed portion 161. Therefore, the heater 18a formed by stacking the plurality of plate-shaped heaters and the flow of the intake air 104 passing through the inside of the passage 12 are parallel to each other. The injection direction of the fuel spray 17 atomized at the recessed portion 161 is inclined by an angle a relative to the surface of the plate-stack-shaped heater 18a.

The present embodiment can also employ a heater 18a which is lattice-shaped, honeycomb shaped and the like, in addition to the plate-stack-shaped heater.

The intake air 104 flowing out from the branch outlet portion 60a of the body 11g into the main passage 12 collides (merges) with the fuel spray 17 at a portion where the fuel spray 17 atomized at the recessed portion 161 comes out to the main passage 12. At that time, the air 104 is mostly composed of the air flowing through the ISC valve 14, the flow rate of which is large, and constitutes a flow directed toward the downstream side in the axial flow direction of the main passage 12. Therefore, the fuel spray 17 is transported by being diverted in the downstream direction in the main passage 12.

The small size droplets among the fuel spray 17 can be transported in the downstream direction through the gaps between the plate-shaped heaters 18a stacked with a predetermined spacing by being carried along the flow of the air 104. The very large size droplets among the fuel spray 17 are not significantly affected by the flow of air 104 and attach onto the heater 18a due to the angle a between the heater 18a and the injection direction of the fuel spray 17.

Therein, since the fuel spray 17 is further atomized by the intake air 103 in the recessed portion 161, most of the fuel spray 17 passes through the heater along the flow of the intake air 104 without colliding with the heater 18a. Therefore, the amount of the fuel reaching the heater 18 is very small, and, accordingly, the consumed electric power required for vaporizing the fuel by the heater 18a can be reduced.

Further, since the velocity of the intake air 104 passing through the heater 18a is relatively fast, vaporization of the fuel spray attached onto the heater 18a can be effectively promoted. This is because the fuel spray 17 attached onto the surface of the heater 18a is formed into liquid films on the surface of the heater 18a, the liquid films are expanded on the surface of the heater 18a by the intake air flow, so that the heat transfer is increased, so that the fuel is efficiently vaporized and the fuel vaporized by the heater 18a is efficiently swept and transported by the intake air 104.

Figure 15:
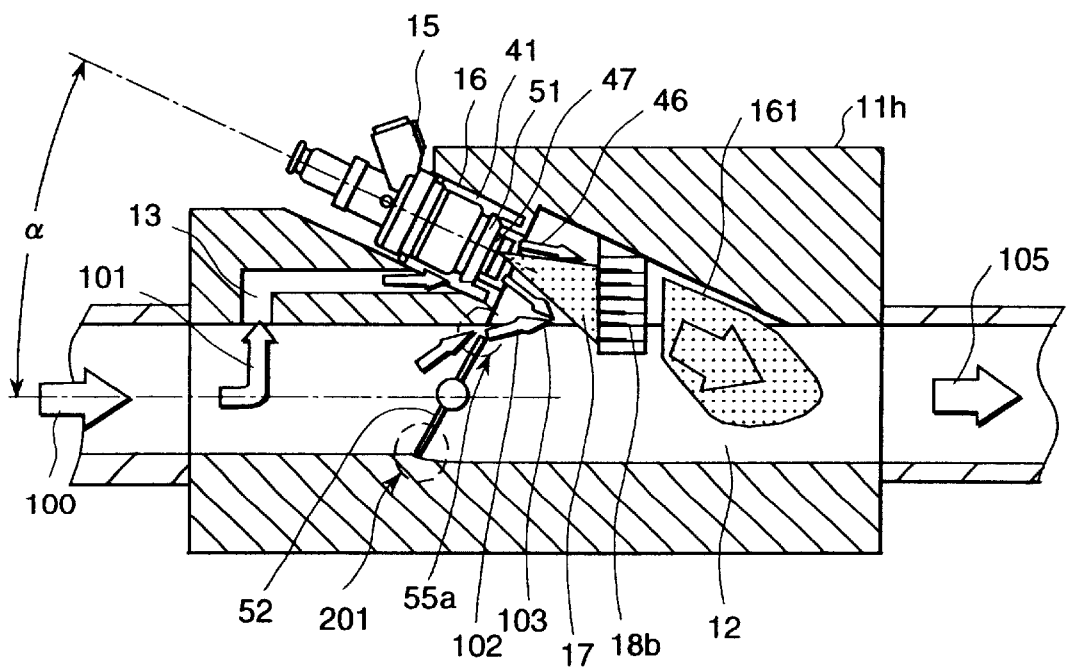
FIG. 15 is a vertical cross-sectional view showing the portion 110 according to a ninth embodiment of an intake air control device in accordance with the present invention.

A ninth embodiment in accordance with the present invention will be described with reference to FIG. 15.

The main differences between the ninth embodiment and the fourth embodiment shown in FIG. 10(a) relate to the structure of the heater 18b for vaporizing the fuel spray 17, and to the fact that the recessed portion 161 is placed near the ETC passage portion 55a in the main passage 12. Also, the projected portion 20, the water jacket 301, the cooling water 300, the bypass flow passage 13b, the pressure regulation chamber 42 and the carrier air passage 45 are eliminated. The other features of the construction are the same as those of the fourth embodiment. Therefore, an overlapped explanation will be omitted here.

In this embodiment, the heater 18b is arranged in the recessed portion 161 formed in the body 11h, and the injection direction of the fuel spray 17 atomized at the recessed portion 161 is inclined by an angle a to the surface of the heater 18b.

The heater 18b is a plate-stack-shaped heater formed by stacking a plurality of the plate-shaped heaters with a predetermined spacing, similar to that of the eighth embodiment. However, the present embodiment can also employ a heater 18a which is lattice-shaped, honeycomb shaped and the like, in addition to the plate-stack-shaped heater.

Since the recessed portion 161 is formed at a position near the downstream side of the ETC passage portion 55a, the air 102 flowing through the ETC passage portion 55a is concentrically supplied to the heater placed in the recessed portion 161. Therefore, the fuel spray 17 which is further atomized in the recessed portion 161 by the fact that it is injected from the circular hole 46 and collides (merges) with the intake air 102 that has passed through the ETC passage portion 55a when passing through the recessed portion 161.

At that time, the amount of the intake air 102 is large compared to that of the intake air 103, and the intake air 102 is concentrically supplied toward the heater 18b. Therefore, the small size droplets among the fuel spray 17 can be transported toward the downstream direction through the gaps between the plate-shaped heaters 18b stacked with a predetermined spacing by being carried along the flow of the air 102.

The very large size droplets among the fuel spray 17 are not significantly affected by the flow of air 102, and so they attach to the heater 18a due to the angle a between the heater 18a and the injection direction of the fuel spray 17. Therefore, since only the very large droplets become attached onto the heater 18b, the amount of fuel attached onto the heater 18b is very small. Thus, the electric power required for vaporization of the fuel as consumed by the heater 18b can be reduced.

Further, since the velocity of the intake air 102 passing through the heater 18b is relatively fast, vaporization of the fuel spray attached onto the heater 18b can be effectively promoted. This is because the fuel spray 17 attached onto the surface of the heater 18b is formed into liquid films on the surface of the heater 18b, the liquid films are expanded on the surface of the heater 18b by the intake air flow, and the heat transfer is increased, so that the fuel is efficiently vaporized. This is caused by the fact that the fuel vaporized by the heater 18b is efficiently swept and transported by the intake air 102.

Figure 16:
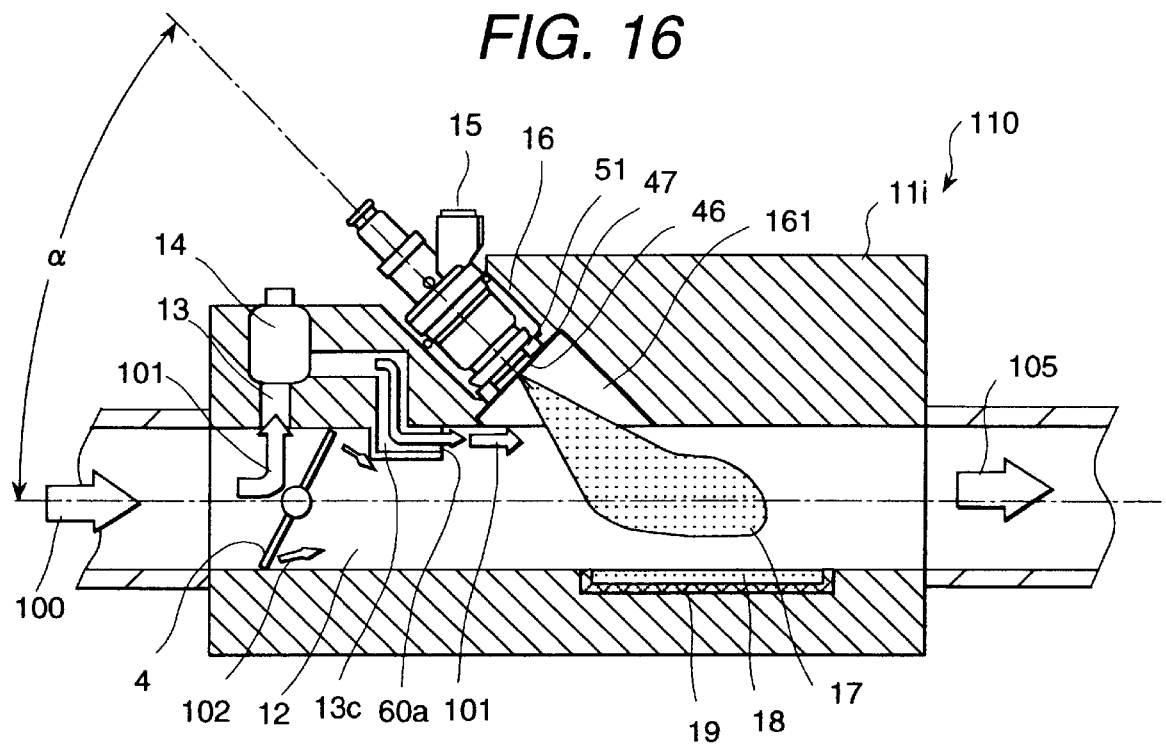
FIG. 16 is a vertical cross-sectional view showing the portion 110 according to a tenth embodiment of an intake air control device in accordance with the present invention.

A tenth embodiment in accordance with the present invention will be described with reference to FIG. 16.

The main difference between the tenth embodiment and the second embodiment shown in FIG. 8(a) is in the body 11i, in which the bypass flow passage 13a branched from the bypass flow passage 13 and the passage forming projected portion 49 are eliminated. Therefore, the pressure regulation chamber 41 formed by inserting the assembly pipe fuel injector 15 into the injector mounting portion 16 is eliminated. Since the passage forming projected portion 49 is eliminated, the shoulder portion 51 of the assembly pipe fuel injector 15 is in contact with the bottom portion of the injector mounting portion 16, and the nozzle 47 is inserted into the circular hole 46 so that the front end surface of the nozzle 47 faces inside the recessed portion 161. Further, the projecting portion 20 formed in the main passage 12 is eliminated. The other features of the construction are the same as those of the second embodiment. Therefore, an overlapped explanation will be omitted here.

In this embodiment, since the intake air 103 passing through the bypass flow passage 13a for atomizing the fuel spray 17 does not exist, so that promoting of atomization of the fuel spray is not performed. Thus, the droplet size of the fuel spray 17 is determined by the condition of injection from the assembly pipe fuel injector 15.

The intake air 101 flowing out from the branch outlet portion 60a collides (merges) with the fuel spray 17 at a portion where the fuel spray 17 that has been injected from the assembly pipe fuel injector 15 flows out into the main passage 12 through the recessed portion 161. Therein, since the intake air 101 is the total amount of air passing through the ISC valve 14 and is a flow directed toward the downstream side in the axial flow direction of the main passage 12, the fuel spray 17 is easily diverted and transported toward the downstream side of the main passage 12.

Thereby, the small size droplets among the fuel spray 17 can be transported in the downstream direction past the heater 18 by being carried along the flow of the air 101. The very large size droplets among the fuel spray 17 are not affected by the flow of air 101 and attach to the heater 18 so as to be vaporized. Therefore, the amount of fuel attached onto the heater 18 is very small. Thus, the electric power required for vaporization of the fuel as consumed by the heater 18b can be reduced.

However, the fuel spray 17 injected from the assembly pipe fuel injector 15 is not promoted in the atomization of the fuel spray 17 to the same extent as that in the case where the atomization is promoted using the atomizing air, and, accordingly, the amount of fuel adhering onto the heater 18 is increased. Therefore, the electric energy consumed by the heater 18 is increased. However, since a very large amount of the intake air 101 collides (merges) with the fuel spray 17, the small sized liquid droplets in the fuel spray 17 do not attach onto the heater 18, and, accordingly, the electric energy consumed by the heater 18 can be decreased by that amount.

Further, if the branch outlet portion 60a is placed upstream of the heater 18 and on the side facing the heater 18 in the main passage 12, the intake air passing above the surface of the heater 18 can be concentrated and, accordingly, the velocity of the intake air passing by the surface of the heater 18 can be made faster.

By providing a construction as described above, the fuel spray 17 attached onto the surface of the heater 18 is formed into liquid films by on the surface of the heater 18, the liquid films are expanded on the surface of the heater 18 by the intake air flow, so that the heat transfer is increased, and the fuel is efficiently vaporized. This is caused by the fact that the fuel vaporized by the heater 18 is efficiently swept and transported by the intake air 102.

However, the fuel spray 17 injected from the assembly pipe fuel injector 15 is not promoted in the atomization of the fuel spray 17 compared to that in the case where the atomization is promoted using the atomizing air, and, accordingly, the amount of fuel adhering onto the heater 18 is increased. Therefore, the electric energy consumed by the heater 18 is increased.

Figure 17:
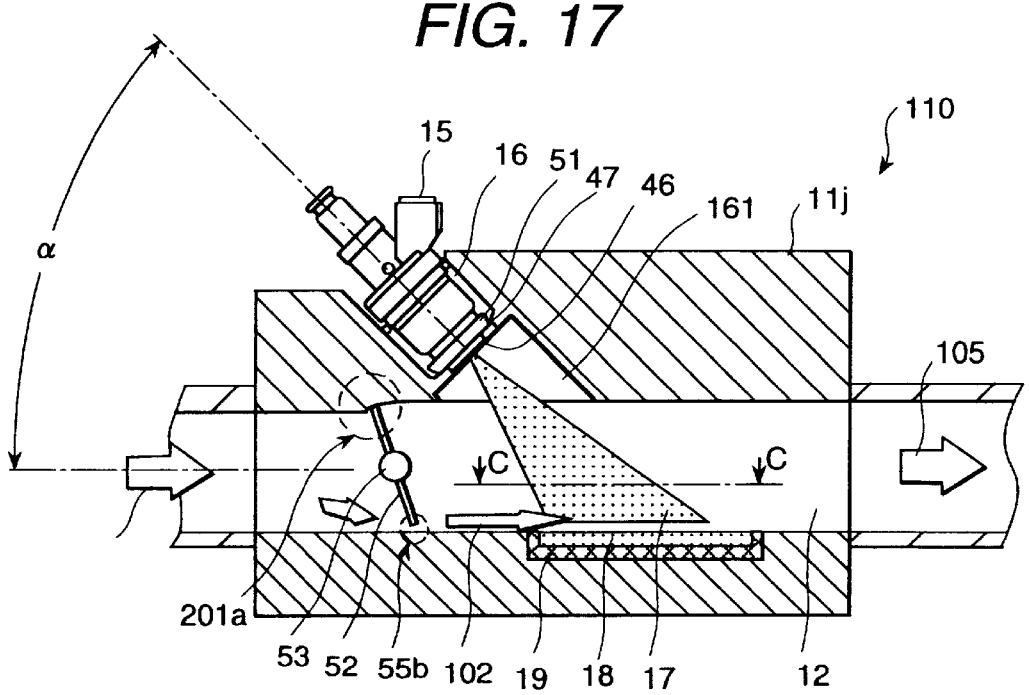
FIG. 17 is a vertical cross-sectional view showing the portion 110 according to an eleventh embodiment of an intake air control device in accordance with the present invention.

An eleventh embodiment in accordance with the present invention will be described with reference to FIG. 17.

Figure 12:
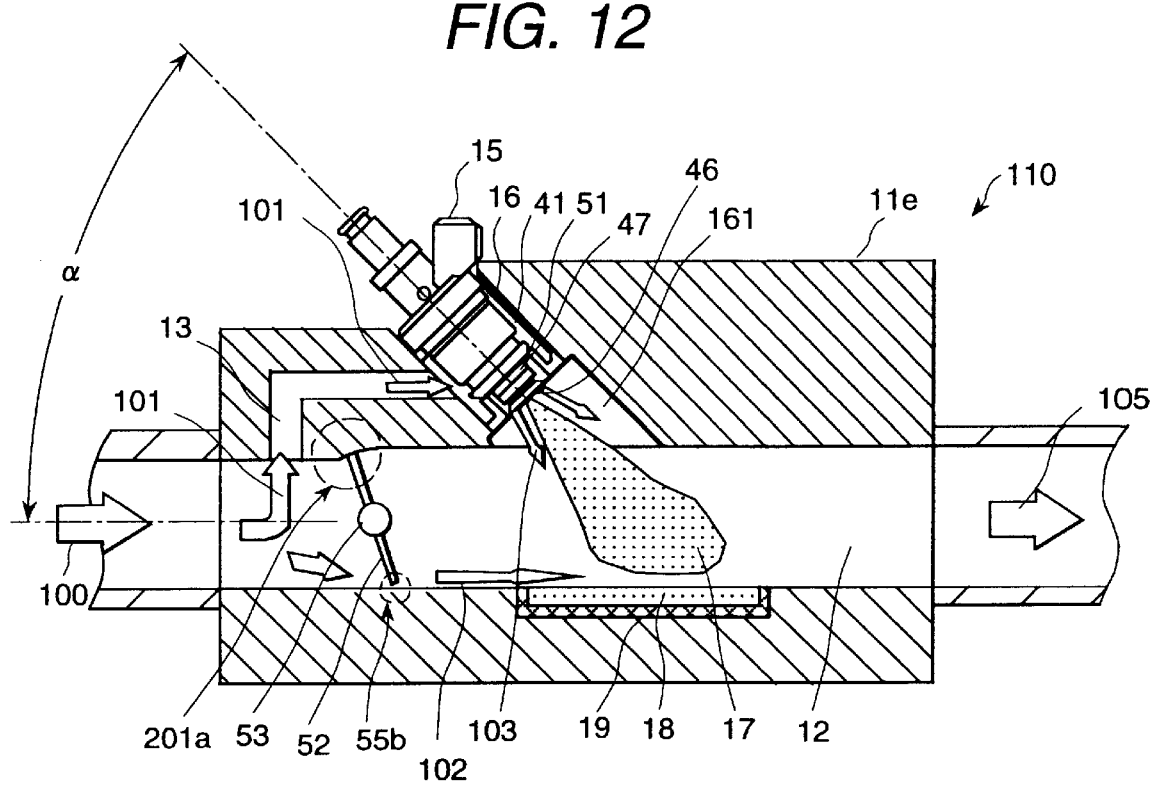
FIG. 12 is a vertical cross-sectional view showing the portion 110 according to a sixth embodiment of an intake air control device in accordance with the present invention.

The main difference between the eleventh embodiment and the sixth embodiment shown in FIG. 12 is in the body 11j, in which the bypass flow passage 13 and the passage forming projected portion 49 are eliminated. Therefore, the pressure regulation chamber 41 formed by inserting the assembly pipe fuel injector 15 into the injector mounting portion 16 is eliminated. Since the passage forming projected portion 49 is eliminated, the shoulder portion 51 of the assembly pipe fuel injector 15 is in contact with the bottom portion of the injector mounting portion 16, and the nozzle 47 is inserted into the circular hole 46 so that the front end surface of the nozzle 47 faces inside the recessed portion 161. The other features of the construction are the same as those of the sixth embodiment. Therefore, an overlapped explanation will be omitted here.

In this embodiment, since the intake air 101 passing through the bypass flow passage 13 for atomizing the fuel spray 17 does not exist, so that promoting of atomization of the fuel spray by the intake air 101 is not performed. Thus, the droplet size of the fuel spray 17 is determined by the condition of injection from the assembly pipe fuel injector 15. The intake air 101 flowing out from the ETC passage portion 55b collides (merges) with the fuel spray 17 above the heater 18 inside the main passage 12. Therein, the intake air 102 is the total amount of air passing through the ETC valve 15 and is a flow directed toward the downstream side in the axial flow direction of the main passage 12. Therefore, the fuel spray 17 is easily diverted and transported toward the downstream side of the main passage 12.

Thereby, the small size droplets among the fuel spray 17 can be transported in the downstream direction past the heater 18 by being carried along the flow of the air 102. The very large size droplets among the fuel spray 17 are not affected by the flow of air 102, and so they attach to the heater 18 so as to be vaporized. Therefore, the amount of fuel attached onto the heater 18 is very small. Thus, the electric power required for vaporization of the fuel as consumed by the heater 18 can be reduced.

Further, since the intake air 102 passing above the surface of the heater 18 is concentrated as it passes through the ETC passage portion 55b, the velocity thereof is relatively faster. Therefore, the fuel spray 17 attached onto the surface of the heater 18 is formed into liquid films on the surface of the heater 18, the liquid films are expanded on the surface of the heater 18 by the intake air flow, and the heat transfer is increased, so that the fuel is efficiently vaporized. This is caused by the fact that the fuel vaporized by the heater 18 is efficiently swept and transported by the intake air 102.

However, the fuel spray 17 injected from the assembly pipe fuel injector 15 is not promoted in the atomization of the fuel spray 17 compared to that in the case where the atomization is promoted using the atomizing air, and, accordingly, the amount of fuel adhering onto the heater 18 is increased. Therefore, the electric energy consumed by the heater 18 is increased.

Figure 18A:
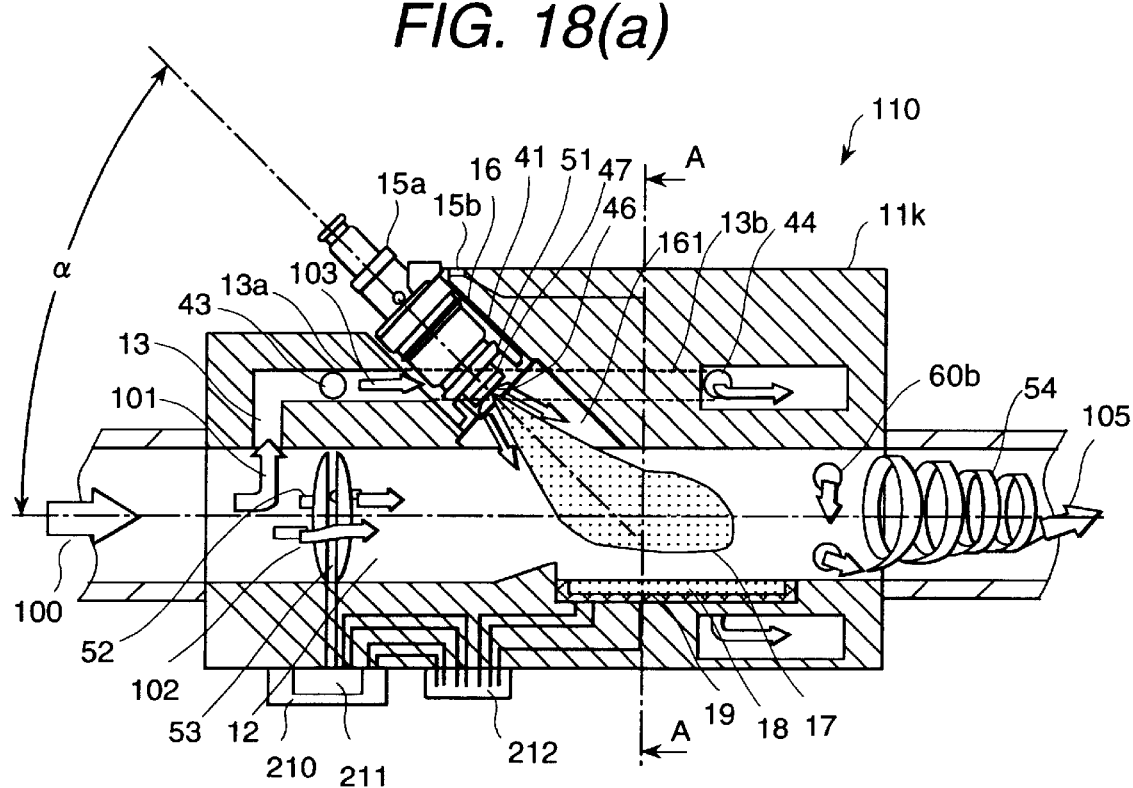
FIG. 18(a) is a vertical cross-sectional view of the portion according to a twelfth embodiment of an intake air control device in accordance with the present invention.
Figure 18B:
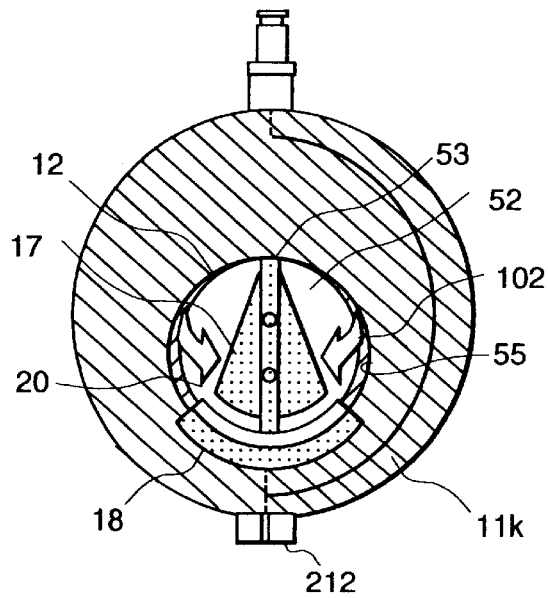
FIG. 18(b) is a cross-sectional view taken on the plane of the line A—A of FIG. 18(a)

A twelfth embodiment in accordance with the present invention will be described with reference to FIGS. 18(a) and 18(b).

The main differences between the twelfth embodiment and the third embodiment shown in FIG. 9(a) are in the provision of a drive motor 210 of the ETC valve 52 and a throttle positioning sensor (hereinafter, referred to as TPS) 211 mounted onto the body 11k of the intake air control device 110, and in the fact that the shape of the connector 15b of the assembly pipe fuel injector 15a is changed, and the wires (bold solid lines in the figure) connecting the assembly connector 212 to the drive motor 210, the TPS 211, the assembly pipe fuel injector 15a and the heater 18 are embedded in the body 11k. The other features of the construction are the same as those of the third embodiment. Therefore, an overlapped explanation will be omitted here.

In this embodiment, the shape of the connector 15b of the assembly pipe fuel injector 15a is changed, and the connection of the wire connecting the connector portion 15b and the assembly connector 212 is performed by inserting the assembly pipe fuel injector 15a into the injector mounting portion 16 provided in the body 11k. Further, the heater 18, the drive motor 210 and the TPS 211 are individually connected to the assembly connector 212 through the wires. Therefore, the components mounted in the body 11k and controlled by the controller 32 (not shown) can be controlled through the single assembly connector 212 provided in the body 11k. Therein, the assembly connector is integrated with the body 11k in a one-piece structure.

Further, at least the wiring portion periphery or the whole of the body 11k is made of an electrically non-conductive material. For example, it is preferable to use PBT resin which is electrically non-conductive, and has been excellent stiffness, heat resistance, abrasion resistance and so on. Further, by forming the sliding portion between the 15 ETC valve 52 and the main passage 12 using members with a lower thermal deformation characteristic made of aluminum or the like, the reliability can be improved.

Further, the assembly connector 212 is connected so as to control each of the components arranged in the body 11k by control signals from the controller 32 (not shown) corresponding to an operating condition of the internal combustion engine 1.

By the construction described above, connectors of the components arranged in the body 11k can be integrated into the assembly connector 212, and the wires can be embedded in the body 11k. Therefore, the reliability of the wiring can be improved, and the ability to assemble the intake air control device 110 and the ability to mount the intake air control device 110 to the internal combustion engine can be improved. Furthermore, since the wires are embedded in electrically non-conductive material, leakage of current from the wires does not occur, thereby to improve the safety.

The features of the present embodiment also can be applied to the above-described embodiments, for example, they can be applied to the intake air control device in which the ISC valve 14 is integrated in the body 11 in a one-piece structure.

Although the assembly pipe fuel injector 15 used in each of the embodiments described above employs a single-hole nozzle fuel injector having a single-hole nozzle, it is preferable to employ a multi-hole nozzle fuel injector having a multi-hole nozzle in order to control the shape of the fuel spray 17 and promote atomization thereof. A step-shaped nozzle fuel injector which has a step in the front end nozzle of the fuel injection hole at the outlet side or a slit nozzle fuel injector is preferable in order to control the shape of the fuel spray 17.

Differences in the shape of the fuel spray and the shape of fuel spray adhering onto a heater depending on differences in various kind of shapes of the spray nozzle will be described with reference to FIG. 19.

In the case of a single-hole nozzle 47, the fuel spray 17 injected from the fuel injection hole 70 becomes conical in shape. Therefore, the front end shape of the injection hole is symmetric with respect to the axis of the nozzle, and the spray shapes as seen from direction of the arrow A and the direction of arrow B become equal to each other, and the outermost angles θ1 and θ2 of the fuel spray 17 become equal to each other. The shape of the fuel spray 17 directed toward the surface of the heater 18 becomes nearly circular in cross-section. However, the shape of the fuel spray 17 impacting onto the surface of the heater 18 becomes ellipsoidal due to the angle a between the assembly pipe fuel injector 15 and the central axis of the main passage 12, as shown by the filled-in area in the figure.

In the case of the multi-hole nozzle 47a, a multi-hole plate 80 having a plurality of small holes 81 is placed downstream of the fuel injection hole 70. Each of the injection holes 81 is very much smaller compared to the fuel injection hole 70. Therefore, the droplet size of the fuel spray 17 injected from the injection holes 81 becomes smaller compared to the droplet size of the fuel spray 17 injected from the single-hole fuel injection hole 70. Therefore, the penetration force of the fuel spray 17 becomes smaller, and the traveling distance of the spray (hereinafter, referred to as penetration) becomes shorter. Further, since the directivity of the spray injected from each of the injection holes 81 can be controlled by adding a directivity to the injection holes 81 bored in the multi-hole plate 80, the angle of the fuel spray 17 can be relatively easily set to a desired value.

Therefore, since the spray angles θ1 and θ2 can be easily set, the shape of fuel spray 17 adhering onto the surface of the heater 18 can be arbitrarily set. For example, the filled-in area of the heater 18 portion illustrated in the lowermost row in the column for the multi-hole nozzle in FIG. 19 can be changed to correspond to the area surrounded by the dotted line. Thereby, the droplet size of the fuel spray 17 can be made smaller, and the penetration can be also shortened, and the area of the fuel spray 17 attaching on the heater 18 can be widened. Therefore, heat from the heater 18 can be efficiently transferred to the fuel attached onto the heater 18, and, accordingly, the vaporization of the fuel can be promoted.

In the case of the step nozzle 47b, an uneven-distribution spray can be formed by cutting away the front end of the nozzle 47b including a part of the fuel injection hole 70 to a given depth to form the cut-away portion 71 illustrated by the hatched area. In this case, the droplet size of the fuel spray 17 becomes larger than that of the fuel spray injected from the single-hole nozzle by several μm. However, an uneven distribution of the fuel spray can be produced by forming the cut-away portion 71, and the penetration of the fuel spray 17 can be shortened. Further, since the shape of the fuel spray 17 adhering onto the surface of the heater 18 can be widened, the vaporization of the fuel can be promoted because heat from the heater 18 can be efficiently transferred to the attached fuel.

In the case of the slit nozzle 47c, the shape of the fuel spray 17 can be made flat by forming a slit groove 72 on the front end of the nozzle 47c with a given width and a given depth so as to pass across on the fuel injection hole 70 as the slit groove 72 illustrated by the hatched area. Similarly to the step nozzle 47b, the droplet size of the fuel spray 17 becomes larger than that of the fuel spray injected from the single-hole nozzle by several μm. However, by flattening the distribution of the fuel spray 17 by forming the slit groove 72, the penetration of the fuel spray 17 can be shortened. Further, since the shape of the fuel spray 17 adhering onto the surface of the heater 18 can be widened, the vaporization of the fuel can be promoted because heat from the heater 18 can be efficiently transferred to the attached fuel.

By use of the various kinds of nozzle shapes described above, the penetration of the fuel spray 17 can be suppressed, and the shape of the fuel spray directed onto the surface of the heater can be set to a desired shape because the shape of the spray can be easily set to a desired shape, and vaporization of the spray can be efficiently promoted by improving heat transfer from the heater 18 to the fuel which impacts on the heater 18. Further, by selectively employing one among various kinds of assembly pipe fuel injector having various kinds of nozzles as described above, an intake air control device having characteristics preferable for various kinds of engines can be constructed.

In all the embodiments in accordance with the present invention described above, in the relationship between the average droplet size of the fuel spray 17 injected from the assembly pipe fuel injector 15 and the average droplet size of the fuel spray injected from the port fuel injector 10, there is always the relationship that the average droplet size of the fuel spray 17 injected from the assembly pipe fuel injector 15 is always smaller than the latter.

Further, all the embodiments in accordance with the present invention described above have been described with reference to what is called an internal combustion engine of the port injection type having port fuel injectors 10 for injecting fuel to individual cylinders in the intake manifold 7 as an example. However, the same effects can be obtained by applying the present invention to what is called the internal combustion engine of the in-cylinder injection type in which fuel is directly injected into the combustion chambers of the internal combustion engine 1.

Each of the embodiments described above may be considered to be a fuel injector having a throttle valve and a drive mechanism for driving the throttle valve, and may be also considered to be a throttle device (an intake air control device) having a fuel injector. In any case, since the fuel injector and the throttle device are constructed in the single body 11 in the form of a one-piece structure which can be mounted on and dismounted from the intake air pipe, assembling, adjustment and maintenance thereof can be easily performed. Particularly, in the case of electronic control throttle valve, operation of the throttle valve and operation of the fuel injector at the time of starting operation of the internal combustion engine can be easily checked.

In each of the embodiments described above, the fuel spray 17 is transported from the assembly pipe fuel injector 15 until it flows into the main passage by the air flow merging at the outlet of the fuel injection hole so as to reduce the amount of fuel being attached onto the wall of the passage; and, after flowing into the main passage, it is transported by the carrier air after flowing into the main passage so as to reduce being attached onto the wall of the main passage. That is, the fuel spray and the carrier air merge with each other after flowing into the main passage. The carrier air merges (collides) with the fuel spray in the main passage with a desired directivity, for example, a directivity along the main passage, or a directivity guiding it to the fuel vaporizer.

As has been described above, according to the present invention, since the fuel spray for warming-up operation can be efficiently transported to the cylinders by one or two air flows so as to reduce the amount of fuel adhering onto the wall of the passage by atomizing, it is possible to provide an intake air control device that is capable of reducing the amount of HC exhausted during the warming-up operation of the engine. Further, since the fuel spray is made to appropriately contact the heater by the carrier air, the consumption of electric power required to vaporize the fuel can be reduced.

Further, since the intake air control device described above is formed in a unit which is mainly composed of the air passage integrated in a body forming the main passage to place the throttle valve therein and the fuel injector fit to the body, the intake air control device is easily manufactured and easily attached to and detached from the internal combustion engine.

What is claimed is:

1. An intake air control device comprising a body having a main flow passage for supplying air to cylinders of an internal combustion engine and a throttle valve for controlling an air flow rate arranged inside said main flow passage; and a fuel injector for supplying fuel into said main flow passage, said fuel injector being fit and attached to said body, wherein said body is formed by working a body member into a one-piece structure comprising an opening portion communicating an outer portion of said body with said main flow passage in a downstream side of said throttle valve; a mounting portion for fitting and attaching said fuel injector facing an opening plane of said opening portion; a first bypass flow passage communicating with said inside of said main flow passage through said opening portion, said first bypass flow passage being branched from said main flow passage in an upstream side of said throttle valve; and a second bypass flow passage communicating with said inside of said main flow passage in the downstream side of said throttle valve and in said upstream side or said downstream side of said opening portion, said second bypass flow passage being branched from said main flow passage in said upstream side of said throttle valve, wherein said body is arranged inside said main flow passage in the downstream side of fuel spray injected from said fuel injector, and contains a fuel atomizer for vaporizing fuel by heating.

2. An intake air control device according to claim 1, wherein a passage of a cooling water recirculating the internal combustion engine is arranged around said fuel atomizer.

3. An intake air control device comprising a body having a main flow passage for supplying air to cylinders of an internal combustion engine and a throttle valve for controlling an air flow rate arranged inside said main flow passage; and a fuel injector for supplying fuel into said main flow passage, said fuel injector being fit and attached to said body, wherein said body is formed by working a body member into a one-piece structure comprising an opening portion communicating an outer portion of said body with said main flow passage in a downstream side of said throttle valve; a mounting portion for fitting and attaching said fuel injector facing an opening plane of said opening portion; a first bypass flow passage communicating with said inside of said main flow passage through said opening portion, said first bypass flow passage being branched from said main flow passage in an upstream side of said throttle valve; and a second bypass flow passage communicating with said inside of said main flow passage in the downstream side of said throttle valve and in said upstream side or said downstream side of said opening portion, said second bypass flow passage being branched from said main flow passage in said upstream side of said throttle valve, wherein a plurality of outlets of said second bypass flow passage are formed on an inner peripheral surface of said main flow passage along a peripheral direction.

4. An intake air control device comprising a body having a main flow passage for supplying air to cylinders of an internal combustion engine and a throttle valve for controlling an air flow rate arranged inside said main flow passage; and a fuel injector for supplying fuel into said main flow passage, said fuel injector being fit and attached to said body, wherein said body is formed by working a body member into a one-piece structure comprising an opening portion communicating an outer portion of said body with said main flow passage in a downstream side of said throttle valve; a mounting portion for fitting and attaching said fuel injector facing an opening plane of said opening portion; a first bypass flow passage communicating with said inside of said main flow passage through said opening portion, said first bypass flow passage being branched from said main flow passage in an upstream side of said throttle valve; and a second bypass flow passage communicating with said inside of said main flow passage in the downstream side of said throttle valve and in said upstream side or said downstream side of said opening portion, said second bypass flow passage being branched from said main flow passage in said upstream side of said throttle valve, wherein a heater is arranged on a wall surface of said main flow passage at a position in a direction of fuel injection of said fuel injector such that the fuel is injected into the main flow passage in a direction toward the heater, and a rotating shaft of said throttle valve and a central axis of said direction of said fuel injection of said fuel injector are arranged to both be in substantially the same plane.

5. An intake air control device comprising a body having a main flow passage for supplying air to cylinders of an internal combustion engine and a throttle valve for controlling an air flow rate arranged inside said main flow passage; and a fuel injector for supplying fuel into said main flow passage, said fuel injector being fit and attached to said body, wherein said body is formed by working a body member into a one-piece structure comprising an opening portion communicating an outer portion of said body with said main flow passage in a downstream side of said throttle valve; a mounting portion for fitting and attaching said fuel injector facing an opening plane of said opening portion; a first bypass flow passage communicating with said inside of said main flow passage through said opening portion, said first bypass flow passage being branched from said main flow passage in an upstream side of said throttle valve; and a second bypass flow passage communicating with said inside of said main flow passage in the downstream side of said throttle valve and in said upstream side or said downstream side of said opening portion, said second bypass flow passage being branched from said main flow passage in said upstream side of said throttle valve, wherein said fuel injector injects fuel splitting into plural times by opening a valve several times with a short cycle during one cycle of a fuel injection determined by a duty ratio.

* * * * *